United States Patent
Grabinger et al.

(10) Patent No.: US 10,113,762 B2
(45) Date of Patent: Oct. 30, 2018

(54) ACTUATOR HAVING AN ADJUSTABLE RUNNING TIME

(75) Inventors: Cory Grabinger, Maple Grove, MN (US); Adrienne Thomle, Plymouth, MN (US); Torrey William McNallan, Plymouth, MN (US); Daniel Waseen, Minneapolis, MN (US)

(73) Assignee: Honeywell International Inc., Morris Plains, NJ (US)

(*) Notice: Subject to any disclaimer, the term of this patent is extended or adjusted under 35 U.S.C. 154(b) by 273 days.

(21) Appl. No.: 13/293,029

(22) Filed: Nov. 9, 2011

(65) Prior Publication Data

US 2013/0116832 A1    May 9, 2013

(51) Int. Cl.
| | |
|---|---|
| *F24F 11/00* | (2018.01) |
| *F24F 11/70* | (2018.01) |
| *G05D 13/08* | (2006.01) |
| *F16K 31/04* | (2006.01) |
| *F24F 140/40* | (2018.01) |

(52) U.S. Cl.
CPC .......... *F24F 11/0076* (2013.01); *F24F 11/70* (2018.01); *F16K 31/04* (2013.01); *F24F 2140/40* (2018.01); *G05D 13/08* (2013.01)

(58) Field of Classification Search
CPC ..................... F24F 11/0076; F24F 2011/0056
USPC ........................................................ 700/276
See application file for complete search history.

(56) References Cited

U.S. PATENT DOCUMENTS

| | | | | |
|---|---|---|---|---|
| 3,767,985 | A | * | 10/1973 | King ............................... 310/83 |
| 3,829,848 | A | | 8/1974 | Eickelberg et al. |
| 4,129,847 | A | | 12/1978 | Teichert |
| 4,185,770 | A | * | 1/1980 | Nagel .................. F23L 11/005 |
| | | | | 126/285 B |
| 4,302,931 | A | | 12/1981 | White et al. |
| 4,506,829 | A | * | 3/1985 | Grant ..................... F24F 13/15 |
| | | | | 137/601.09 |

(Continued)

FOREIGN PATENT DOCUMENTS

| | | |
|---|---|---|
| DE | 202004011803 | 12/2004 |
| EP | 0511828 | 11/1992 |

(Continued)

OTHER PUBLICATIONS

Ruff, M., "Freescale Semiconductor, Application Note, Servo Motor Control Application on a Local Interconnect Network (LIN)", Dec. 2005, Freescale Semiconductor, AN2396, Rev. 1.0.*

(Continued)

*Primary Examiner* — Mohammad Ali
*Assistant Examiner* — Kelvin Booker
(74) *Attorney, Agent, or Firm* — Seager Tufte & Wickhem LLP

(57) ABSTRACT

An actuator system having an actuator with a rotatable shaft. The shaft may have a first running time to rotate from a first position to a second position in one direction. The shaft may have a second running time to rotate from a first position to a second position in another direction. The first and second running times may be separately adjustable. A motor may be connected through a gear train to the rotatable shaft. A processor may control a rotation of the motor and thus the running times of the shaft. The running times may be adjusted with signals to the processor from a remote controller connected to the processor via a communications bus.

20 Claims, 27 Drawing Sheets

(56) References Cited

U.S. PATENT DOCUMENTS

| | | | |
|---|---|---|---|
| 4,533,800 A * | 8/1985 | Parsons | H01H 3/16 200/47 |
| 4,549,446 A * | 10/1985 | Beeson | 74/625 |
| 4,581,987 A * | 4/1986 | Ulicny | A62C 2/06 185/40 R |
| 4,628,268 A | 12/1986 | Matsubara | |
| 4,652,417 A | 3/1987 | Sutherland et al. | |
| 4,673,920 A | 6/1987 | Ferguson et al. | |
| 4,688,183 A | 8/1987 | Carll et al. | |
| 4,742,475 A | 5/1988 | Kaiser et al. | |
| 4,750,545 A * | 6/1988 | Hile | F24F 11/0009 165/226 |
| 4,794,314 A * | 12/1988 | Janu et al. | 318/685 |
| 4,854,852 A | 8/1989 | Patton et al. | |
| 4,872,213 A * | 10/1989 | Sebald | G05B 15/02 700/75 |
| 4,878,001 A * | 10/1989 | Hagikura et al. | 318/446 |
| 4,919,328 A * | 4/1990 | Hara et al. | 236/49.3 |
| 4,922,171 A * | 5/1990 | Ohi | 318/471 |
| 5,025,206 A | 6/1991 | Germer et al. | |
| 5,080,140 A * | 1/1992 | Ostrand | B60H 1/00692 137/875 |
| 5,081,405 A | 1/1992 | Nelson | |
| 5,123,875 A * | 6/1992 | Eubank et al. | 454/342 |
| 5,153,493 A | 10/1992 | Jornod et al. | |
| 5,159,534 A | 10/1992 | Hudson et al. | |
| 5,180,959 A | 1/1993 | Christopher | |
| 5,310,021 A * | 5/1994 | Hightower | F24F 13/1426 185/40 R |
| 5,318,516 A | 6/1994 | Cosmescu | |
| 5,416,781 A | 5/1995 | Ruiz | |
| 5,422,553 A | 6/1995 | MacLennan et al. | |
| 5,431,182 A | 7/1995 | Brown | |
| 5,446,677 A | 8/1995 | Jensen et al. | |
| 5,454,273 A | 10/1995 | Smith | |
| 5,465,031 A | 11/1995 | Nilssen | |
| 5,579,993 A * | 12/1996 | Ahmed | F24F 11/0009 236/49.3 |
| 5,584,319 A | 12/1996 | Cholin | |
| 5,621,398 A | 4/1997 | Blair et al. | |
| 5,682,329 A | 10/1997 | Seem et al. | |
| 5,711,480 A | 1/1998 | Zepke et al. | |
| 5,744,923 A * | 4/1998 | Strauss et al. | 318/563 |
| 5,836,814 A * | 11/1998 | Cunningham, Jr. | 454/234 |
| 5,848,609 A | 12/1998 | Marchessault et al. | |
| 5,905,752 A * | 5/1999 | Sieradzki | F27B 3/085 373/84 |
| 5,938,524 A * | 8/1999 | Cunningham, Jr. | 454/234 |
| 5,970,997 A * | 10/1999 | Hudson | F16K 31/046 137/1 |
| 6,015,142 A * | 1/2000 | Ulicny | F16F 1/10 267/154 |
| 6,021,955 A * | 2/2000 | Pasch | F16K 1/221 236/1 B |
| 6,025,788 A | 2/2000 | Diduck | |
| 6,035,878 A | 3/2000 | Adams et al. | |
| 6,051,948 A | 4/2000 | Vepy | |
| 6,059,046 A | 5/2000 | Lowry | |
| 6,099,405 A * | 8/2000 | Cunningham, Jr. | 454/228 |
| 6,178,997 B1 | 1/2001 | Adams et al. | |
| 6,198,243 B1 * | 3/2001 | Ritmanich | F24F 13/1426 318/266 |
| 6,202,429 B1 * | 3/2001 | Kinkel | F24F 1/022 62/171 |
| 6,249,100 B1 | 6/2001 | Lange | |
| 6,431,203 B1 | 8/2002 | Zhu et al. | |
| 6,431,231 B1 | 8/2002 | Zhu et al. | |
| 6,443,422 B1 | 9/2002 | Gluf, Jr. | |
| 6,514,138 B2 * | 2/2003 | Estepp | 454/229 |
| 6,629,886 B1 * | 10/2003 | Estepp | 454/229 |
| 6,651,952 B1 * | 11/2003 | Hightower | F16K 31/047 251/129.13 |
| 6,725,976 B2 * | 4/2004 | Oh et al. | 185/40 B |
| 6,838,988 B2 | 1/2005 | Lennartz et al. | |
| 6,844,692 B1 * | 1/2005 | Jasinski | B60H 1/00835 318/268 |
| 6,851,620 B2 | 2/2005 | Hill | |
| 6,915,171 B2 | 7/2005 | Mayer | |
| 6,922,123 B2 | 7/2005 | Lalonde et al. | |
| 6,954,044 B2 * | 10/2005 | McMillan et al. | 318/400.34 |
| 6,979,965 B2 * | 12/2005 | McMillan et al. | 318/160 |
| 7,021,072 B2 | 4/2006 | McMillan et al. | |
| 7,024,856 B2 * | 4/2006 | Ando | F02B 37/24 60/602 |
| 7,031,880 B1 | 4/2006 | Seem et al. | |
| 7,033,268 B2 | 4/2006 | Caliendo et al. | |
| 7,058,542 B2 | 6/2006 | Hauhia et al. | |
| 7,066,273 B2 | 6/2006 | Tan | |
| 7,079,831 B2 | 7/2006 | Schwartzman et al. | |
| 7,105,949 B2 | 9/2006 | Wang et al. | |
| 7,188,481 B2 * | 3/2007 | DeYoe et al. | 62/115 |
| 7,241,218 B2 | 7/2007 | Van Becelaere et al. | |
| 7,265,512 B2 | 9/2007 | McMillan et al. | |
| 7,378,980 B2 | 5/2008 | McFarland | |
| 7,401,541 B2 | 7/2008 | McCarroll et al. | |
| 7,442,068 B2 | 10/2008 | Hammer et al. | |
| 7,446,494 B2 | 11/2008 | Grabinger et al. | |
| 7,451,759 B2 | 11/2008 | Weiss et al. | |
| 7,460,013 B1 | 12/2008 | Osborne et al. | |
| 7,476,988 B2 | 1/2009 | Mulhouse et al. | |
| 7,477,028 B2 | 1/2009 | Bokusky et al. | |
| 7,492,233 B2 | 2/2009 | Grabinger | |
| 7,525,266 B2 | 4/2009 | Bolusky et al. | |
| 7,533,635 B2 | 5/2009 | Bradley et al. | |
| 7,557,549 B2 | 7/2009 | Underhill | |
| 7,586,279 B2 | 9/2009 | Theunissen et al. | |
| 7,622,828 B2 | 11/2009 | Grabinger et al. | |
| 7,633,393 B2 | 12/2009 | Bonne | |
| 7,636,613 B2 | 12/2009 | Borah et al. | |
| 7,639,127 B2 | 12/2009 | Kastli | |
| 7,653,459 B2 | 1/2010 | Pouchak et al. | |
| 7,664,573 B2 | 2/2010 | Ahmed | |
| 7,672,913 B2 | 3/2010 | Kaplan et al. | |
| 7,697,492 B2 | 4/2010 | Petite | |
| 7,774,441 B2 | 8/2010 | Frutiger et al. | |
| 7,784,291 B2 | 8/2010 | Butler et al. | |
| 7,787,994 B2 | 8/2010 | Wacker | |
| 7,798,170 B2 | 9/2010 | Hotz et al. | |
| 7,802,734 B2 | 9/2010 | Stanimirovic | |
| 7,831,338 B1 * | 11/2010 | Haydu | G05D 7/0635 700/276 |
| 7,840,311 B2 | 11/2010 | Grohman | |
| 7,852,627 B2 * | 12/2010 | Schmitt et al. | 361/695 |
| 7,852,765 B2 | 12/2010 | Neuman et al. | |
| 7,876,217 B2 | 1/2011 | Laackmann et al. | |
| 7,881,678 B2 | 2/2011 | Menden et al. | |
| 7,891,241 B2 | 2/2011 | McSheffrey et al. | |
| 7,922,149 B2 * | 4/2011 | Anderson et al. | 251/129.01 |
| 7,944,672 B1 | 5/2011 | Chiang | |
| 7,966,438 B2 | 6/2011 | Punyko et al. | |
| 8,031,650 B2 | 10/2011 | Petite et al. | |
| 8,038,075 B1 * | 10/2011 | Walsh | F24F 13/1426 236/1 B |
| 8,046,896 B2 * | 11/2011 | Schmitt et al. | 29/469 |
| 8,084,980 B2 | 12/2011 | Carlson et al. | |
| 8,218,547 B2 | 7/2012 | Van Steen et al. | |
| 8,251,785 B2 * | 8/2012 | Schmitt et al. | 454/184 |
| 8,588,983 B2 * | 11/2013 | Grabinger et al. | 700/276 |
| 8,764,529 B2 * | 7/2014 | Cook et al. | 454/256 |
| 9,403,056 B2 * | 8/2016 | Weinberg | A63B 23/14 |
| 9,623,523 B2 * | 4/2017 | Du | F24F 11/74 |
| 9,732,980 B2 * | 8/2017 | Du | F24F 11/74 |
| 2002/0090908 A1 | 7/2002 | Estepp | 454/236 |
| 2003/0052180 A1 | 3/2003 | Huhn et al. | |
| 2003/0155428 A1 * | 8/2003 | Fiegle et al. | 236/49.3 |
| 2003/0178257 A1 * | 9/2003 | Oh et al. | 74/625 |
| 2004/0084542 A1 * | 5/2004 | DeYoe | F24F 13/1426 236/49.3 |
| 2004/0124797 A1 | 7/2004 | Takeuchi et al. | |
| 2004/0212336 A1 * | 10/2004 | McMillan | F16K 31/046 318/400.01 |
| 2005/0022880 A1 * | 2/2005 | Schlosser | F16K 1/165 137/601.11 |

(56) References Cited

U.S. PATENT DOCUMENTS

| | | | |
|---|---|---|---|
| 2005/0127861 A1* | 6/2005 | McMillan | H02P 6/182 318/400.34 |
| 2005/0145230 A1* | 7/2005 | Eriksson | F16K 11/165 123/568.12 |
| 2005/0224591 A1* | 10/2005 | Wolfson | F24F 11/0001 236/49.3 |
| 2006/0035580 A1* | 2/2006 | Anderson | F24F 13/1426 454/309 |
| 2006/0071504 A1* | 4/2006 | Ishihara | E05F 15/63 296/146.4 |
| 2006/0130502 A1 | 6/2006 | Wruck et al. | |
| 2007/0046236 A1* | 3/2007 | McMillan | G05B 19/42 318/466 |
| 2007/0060039 A1* | 3/2007 | Cook et al. | 454/255 |
| 2007/0120664 A1 | 5/2007 | Bilbrey et al. | |
| 2007/0226318 A1 | 9/2007 | Rydberg et al. | |
| 2007/0298706 A1* | 12/2007 | Hudon | F24F 13/15 454/256 |
| 2008/0051024 A1* | 2/2008 | Caliendo | A62C 2/14 454/369 |
| 2008/0111512 A1* | 5/2008 | Theunissen | G05B 19/042 318/466 |
| 2008/0244104 A1 | 10/2008 | Clemente | |
| 2008/0258253 A1 | 10/2008 | Fey et al. | |
| 2008/0287052 A1* | 11/2008 | Cook et al. | 454/256 |
| 2008/0316039 A1 | 12/2008 | White et al. | |
| 2009/0005917 A1 | 1/2009 | Hole | |
| 2009/0033513 A1 | 2/2009 | Salsbury et al. | |
| 2009/0082880 A1 | 3/2009 | Saunders | |
| 2009/0101725 A1 | 4/2009 | Dolan et al. | |
| 2009/0111373 A1* | 4/2009 | Hollender | F24F 11/0086 454/333 |
| 2009/0181611 A1* | 7/2009 | Hollender | F24F 11/0086 454/333 |
| 2010/0077254 A1 | 3/2010 | Erdmann et al. | |
| 2010/0102973 A1 | 4/2010 | Grohman et al. | |
| 2010/0106262 A1 | 4/2010 | Schreyer et al. | |
| 2010/0106836 A1 | 4/2010 | Schreyer et al. | |
| 2010/0109675 A1 | 5/2010 | Wong et al. | |
| 2010/0110626 A1* | 5/2010 | Schmitt et al. | 361/679.47 |
| 2010/0112925 A1* | 5/2010 | Schmitt et al. | 454/184 |
| 2010/0114356 A1* | 5/2010 | Schmitt et al. | 700/117 |
| 2010/0121613 A1 | 5/2010 | Rosca et al. | |
| 2010/0134934 A1 | 6/2010 | Matsubara et al. | |
| 2010/0139308 A1* | 6/2010 | Eguchi et al. | 62/408 |
| 2010/0141243 A1 | 6/2010 | Divicino et al. | |
| 2010/0170277 A1* | 7/2010 | Schmitt et al. | 62/259.2 |
| 2010/0198411 A1* | 8/2010 | Wolfson | G05B 15/02 700/275 |
| 2010/0253270 A1 | 10/2010 | Kuster et al. | |
| 2010/0316395 A1* | 12/2010 | Hayashi | G03G 15/04036 399/9 |
| 2011/0070904 A1 | 3/2011 | McFarland | |
| 2011/0117829 A1* | 5/2011 | Ikeda | B60H 1/00064 454/155 |
| 2011/0269389 A1* | 11/2011 | Scharf | F24F 13/1426 454/258 |
| 2011/0270446 A1* | 11/2011 | Scharf | F24F 11/0001 700/282 |
| 2012/0091804 A1* | 4/2012 | Altonen et al. | 307/31 |
| 2012/0255720 A1* | 10/2012 | Miller | F24F 11/70 165/217 |
| 2012/0261078 A1* | 10/2012 | Adams | E06B 9/32 160/6 |
| 2012/0302150 A1* | 11/2012 | Schmitt et al. | 454/184 |
| 2013/0049644 A1* | 2/2013 | Neumann | F24F 13/1426 318/15 |
| 2013/0113402 A1* | 5/2013 | Grabinger et al. | 318/400.26 |
| 2013/0324026 A1* | 12/2013 | Fiorita, Jr. | F24F 3/161 454/187 |
| 2014/0295750 A1* | 10/2014 | Anderson et al. | 454/256 |
| 2015/0111489 A1* | 4/2015 | Chopra | F24F 13/1426 454/333 |
| 2015/0168007 A1* | 6/2015 | Du | F24F 11/74 236/49.5 |
| 2015/0226001 A1* | 8/2015 | Adams | E06B 9/72 160/84.02 |
| 2017/0045255 A1* | 2/2017 | Karamanos | G05D 7/0635 |
| 2017/0115023 A1* | 4/2017 | Du | F24F 11/30 |
| 2017/0146256 A1* | 5/2017 | Alexander | F24F 11/001 |

FOREIGN PATENT DOCUMENTS

| | | |
|---|---|---|
| EP | 1170036 | 1/2002 |
| EP | 1901145 | 3/2008 |
| EP | 2241834 | 10/2010 |
| GB | 1172789 | 12/1969 |
| JP | 57086544 | 5/1982 |
| JP | 60091411 | 5/1985 |
| JP | 63257802 | 10/1988 |
| JP | 1215633 | 8/1989 |
| JP | 2009118155 | 5/2009 |
| WO | WO 2010000077 | 1/2010 |

OTHER PUBLICATIONS

Siemens Switzerland Ltd, "OpenAir-Robust Damper Actuators for Energy-Efficient Ventilation", 2011, Retrieved from the Internet at "www.Siemens.com/openair".*
"555 Timer IC," Wikipedia, the Free Encyclopedia, 9 pages, Aug. 7, 2012.
Beckhoff New Automation Technology, "Application Note DK9222-0810-0035, I/O, Building Automation," 7 pages, Aug. 2010.
Belimo, "Belimo Gateway MP to Modbus RTU-UK24MOD," Product Information, 20 pages, Feb. 2010.
Belimo, "Damper Actuator Plug-In Description/Documentation #Tools-007-E_20.11.05," 11 pages, Nov. 20, 2005.
Belimo, "MP-Bus-Interface—for Belimo Damper Actuators," 16 pages, Oct. 2009.
Belimo, "Perfect for Each and Every Connection, Bus Integration of Actuators and Sensors in Heating, Ventilation, and Air Conditioning Systems," 10 pages, prior to Sep. 30, 2011.
Belimo, "Ring Bus Solution by Belimo, State of the Art System for Bus Integrated Fire Protection and Smoke Control," 6 pages, prior to Sep. 30, 2011.
U.S. Appl. No. 13/250,889, filed Sep. 30, 2011.
U.S. Appl. No. 13/278,694, filed Oct. 21, 2011.
U.S. Appl. No. 13/291,928, filed Nov. 8, 2011.
U.S. Appl. No. 13/293,041, filed Nov. 9, 2011.
U.S. Appl. No. 13/293,051, filed Nov. 9, 2011.
Delta Controls, "HVAC Application Controllers DVC-V322," Document Edition 2.0, 7 pages, Feb. 2005.
Distech Controls, "ECC-VAV/ECC-VVT easyCONTROLS LonMark Certified Application Specific Single Duct Variable Air Volume/Variable Volume Temperature Controllers," 5 pages, prior to Sep. 30, 2011.
Echelon, "LNS Plug-In Belimo," 1 page, 2011.
Honeywell, "3 Nm, 5 Nm Series Spring Return Direct Coupled Actuators, MS3103, MS3105, MS4103, MS4105, MS7403, MS7405, MS7503, MS7505, MS8103, MS8105," Installation Instructions, 12 pages, 2011.
Honeywell, "Advanced Control from a Unitary Controller," 8 pages, Mar. 2009.
Honeywell, "Jade Economizer Module (Model W7220)," Installation Instructions, 20 pages, 2010.
Honeywell, "ML4202, ML4302, ML4702, ML4802, ML8202, ML8302 Fast-Acting, Two-Position Actuators for Fire/Smoke Control Applications," Installation Instructions, 4 pages, 2005.
Honeywell, "S05, S10, S20 Series Spring Return Direct Coupled Actuators, MS4105, MS4110, MS4120, MS71XX, MS7505, MS7510, MS7520, MS8105, MS8110, MS8120," Product Data, 16 pages, 2008.
Johnson Controls Unitary Products, "YCCS Zone Bypass Damper Assembly," 6 pages, 2008.
Microchip Technology, Inc., "Using PWM to Generate Analog Output AN538," 2 pages, 1997.

(56) References Cited

OTHER PUBLICATIONS

Motorola, "Triacs Silicon Bidirectional Triode Thyristors," 2 pages, prior to Sep. 30, 2011.
MP-Bus Technology by Belimo, "MP-Bus Convenient and Secure Integration of Belimo Actuator Drives," 1 page, prior to Sep. 30, 2011.
Noliac, "Noliac Acquires Piezo Actuator Drive Technology from Siemens," 2 pages, prior to Sep. 30, 2011.
On Semiconductor, "AND8054/D Designing RC Oscillator Circuits with Low Voltage Operational Amplifiers and Comparators for Precision Sensor Applications," 3 pages, Jul. 2001.
Siemens, "BACnet ATEC," Technical Specification Sheet Document No. 149-825, 4 pages, Apr. 9, 2010.
Siemens, "Siemens, BACnet VAV Actuator," Technical Specification Sheet Rev. AA, 5 pages, Jan. 2008.
Tridium, "Belimo and Tridium to Jointly Develop a Next Generation VAV Controller with Wireless Communications," 2 pages, May 15, 2008.
Wang et al., "Research on Reliability of a Hybrid Three-Redundant Electro-Mechanical Actuator," Proceedings of the 2009 IEEE International Conference on Mechatronics and Automation, Aug. 9-12, 2009.
Honeywell, "Spyder Sylk Enhanced, Advanced Control From a Unitary Controller," 8 pages, Mar. 2009.
Honeywell, "Spyder Sylk Enhanced," 11 pages, Oct. 2008.
ControlTrends Article Entitled, "Honeywell Zelix Actuators," 1 page, published on the internet Nov. 11, 2009.

* cited by examiner

ACTUATOR HAVING AN ADJUSTABLE RUNNING TIME

BACKGROUND

The present disclosure pertains to control devices and particularly to mechanical movers of devices. More particularly, the disclosure pertains of actuators.

SUMMARY

The disclosure reveals an actuator system having an actuator with a rotatable shaft. The shaft may have a first running time to rotate from a first position to a second position in one direction. The shaft may have a second running time to rotate from a first position to a second position in another direction. The first and second running times may be separately adjustable. A motor may be connected through a gear train to the rotatable shaft. A processor may control a rotation of the motor and thus the running times of the shaft. The running times may be adjusted with signals to the processor from a remote controller connected to the processor via a communications bus.

DESCRIPTION

Coupled actuators may be used within heating, ventilating and air-conditioning (HVAC) systems. They may drive final control elements. Example applications may incorporate volume control dampers, mounted directly to the drive shaft of the actuator or remotely with the use of accessory hardware, rotary valves such as ball or butterfly valves mounted directly to the actuator drive shaft, and linear stroke or cage valves mounted with linkages to provide linear actuation. The actuator may also be used to operate ventilation flaps, louvers and other devices. The actuator may be a spring return device designed for clockwise or counter-clockwise fail-safe operation with a continuously engaged mechanical spring. The spring may return the actuator or the mechanism that the actuator is operating to a fail-safe position within a certain time of power loss. An example of the certain time may be 25 seconds. The actuator may be mounted to provide clockwise or counterclockwise spring return by flipping or turning the unit over. The stroke of the actuator may be adjusted for an application at hand. An auxiliary knob may be used to control minimum position or switch position. For switch position, a degree of rotation may be selected for where the switch is desired to activate. The actuator may have an override of the control signal for certain applications such as for example freeze protection. The override may move the actuator to a full open or full closed position. One instance of position change is that the actuator may be designed to respond to direct digital control (DDC) instantaneous contact closures.

Figure 1:
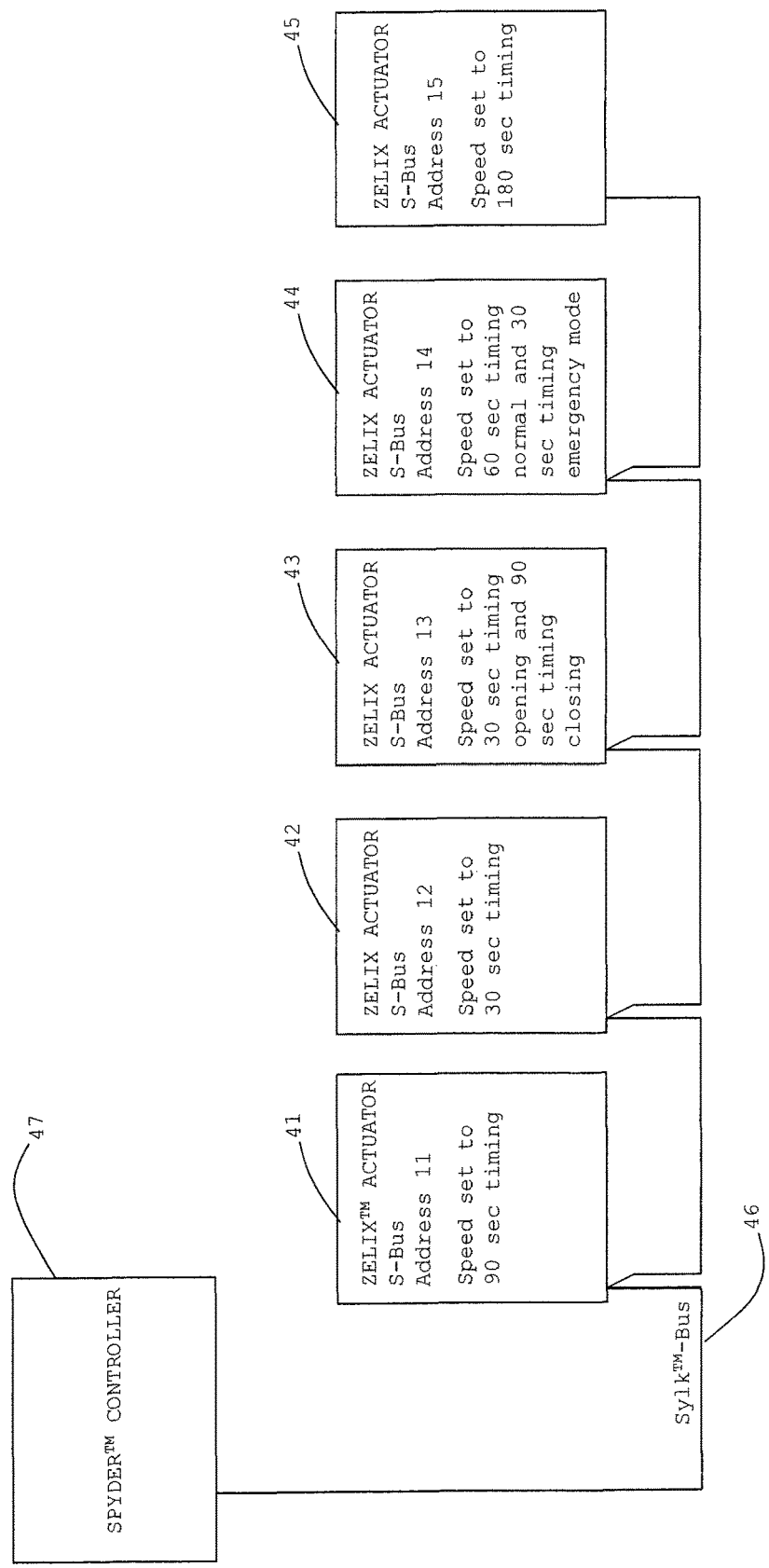
FIG. 1 is a diagram of an example layout of actuators and a controller connected to a common bus.

FIG. 1 is a diagram of an example layout of actuators 41, 42, 43, 44 and 45 connected to a common bus 46. Bus 46 may be connected to a controller 47. Controller 47 may be Spyder controller. Bus 46 may be a Sylk bus. The actuators may be Zelix actuators. Each actuator may have its open and close speeds individually set by controller 47 via signals on bus 46. For examples of various settings, actuator 41 may have a speed set to a 90 second timing, actuator 42 a speed set to a 30 second timing; actuator 43 a speed set to a 30 second timing for opening and a 90 second timing for closing, actuator 44 a speed set to a 60 second timing for a normal mode and a 30 second timing for an emergency mode, and actuator 45 a speed set for a 180 second timing. The speeds each of the actuators may be set to different timings. When a speed of an individual actuator is set by controller 47, the respective actuator may be selected according to its address. Fir instance, actuators 41, 42, 43, 44 and 45 may have addresses 11, 12, 13, 14 and 15, respectively.

Figure 2:
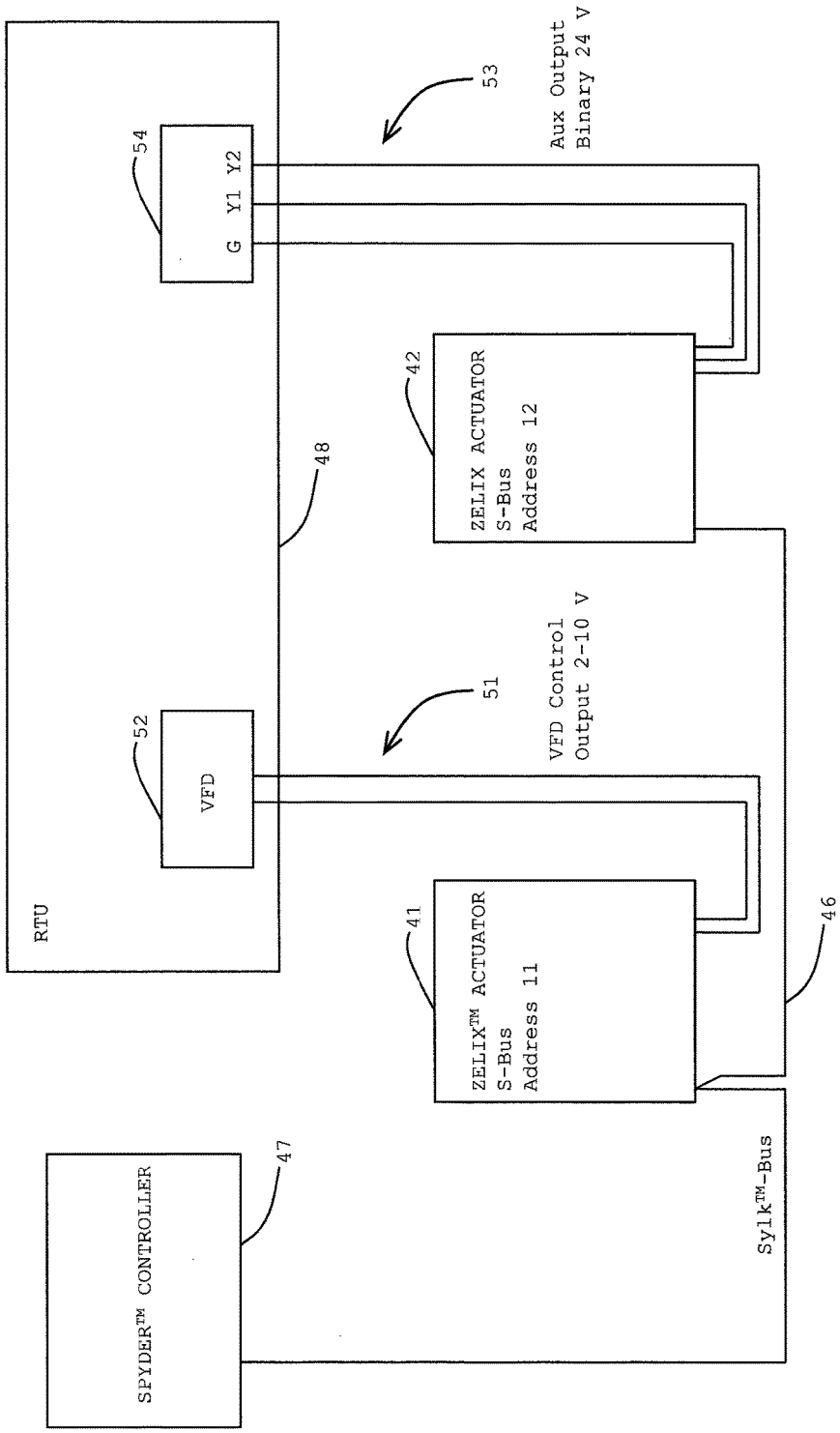
FIG. 2 is a diagram of actuators connected to a controller via a bus and to a roof top unit.

FIG. 2 is a diagram of actuators 41 and 42 connected to controller 47 via bus 46. Actuators 41 and 42 may have connections to a roof top unit (RTU) 48. Actuator 41 may have a variable frequency drive control output of 2 to 10volts along lines 51 to a component 53 at RTU 48. Actuator 42 may have an auxiliary output binary 24 volts along lines to a component 54 of RTU 48.

A present actuator with an auxiliary output may be adjustable via network communications. Auxiliary (aux) switches on actuators in some of the related art may have their setpoints established locally on the actuator. Setting an auxiliary switch setpoint may be rather difficult because of an actuator location (e.g., in a ceiling or behind equipment) and in general auxiliary switch setpoint user interfaces may be difficult to set and see (e.g., cam systems, rotating assemblies and adjustable detents) which could lead to setpoint inaccuracies. Also, there may be a fixed hysteresis with each of these solutions.

An additional problem with some of the solutions in the related art is that they are not necessarily adjustable as a relevant application changes. For example, an aux switch may be set to make or break at around 45 degrees of the actuator's stroke. If set for 45 degrees, the aux switch may virtually always trip at that position and can not necessarily be changed without a service technician physically changing the setpoint. Some applications would benefit by having the aux switch make at 20 degrees while opening, and break at 60 degrees while closing, or 20 degrees during a heat mode and 45 degrees during a cool mode, or vice versa.

Also, some of the aux switches of the related art may only be able to change state based on an actuator shaft position. There may be many applications where switching the aux switch based on temperature or some other variable (or combination of variables) would be beneficial.

The present approach may solve the issues by allowing the auxiliary switch setpoint and control parameters to be configured remotely over the bus in real time. This approach may be implemented with digital or analog outputs and there could be a multiple setpoint per relay solution.

The present approach may be effected by enhancing the software in the controller and communicating actuator systems. It may be used by allowing the auxiliary switch parameters to be programmable via a higher order controller. An example may incorporate using a Jade controller or Spyder™ controller with Niagara™ (or fishsim™) to program the functionality of a Sylk™ Zelix™ communicating actuator over a Sylk bus. A Sylk bus may be a two-wire, polarity insensitive bus that may provide communications between a Sylk-enabled actuator and a Sylk-enabled controller. An example of the Sylk bus circuitry may be disclosed in U.S. Pat. No. 7,966,438, issued Jun. 21, 2011, and entitled "Two-wire Communications Bus System". U.S. Pat. No. 7,966,438, issued Jun. 21, 2011, is hereby incorporated by reference.

Figure 3:
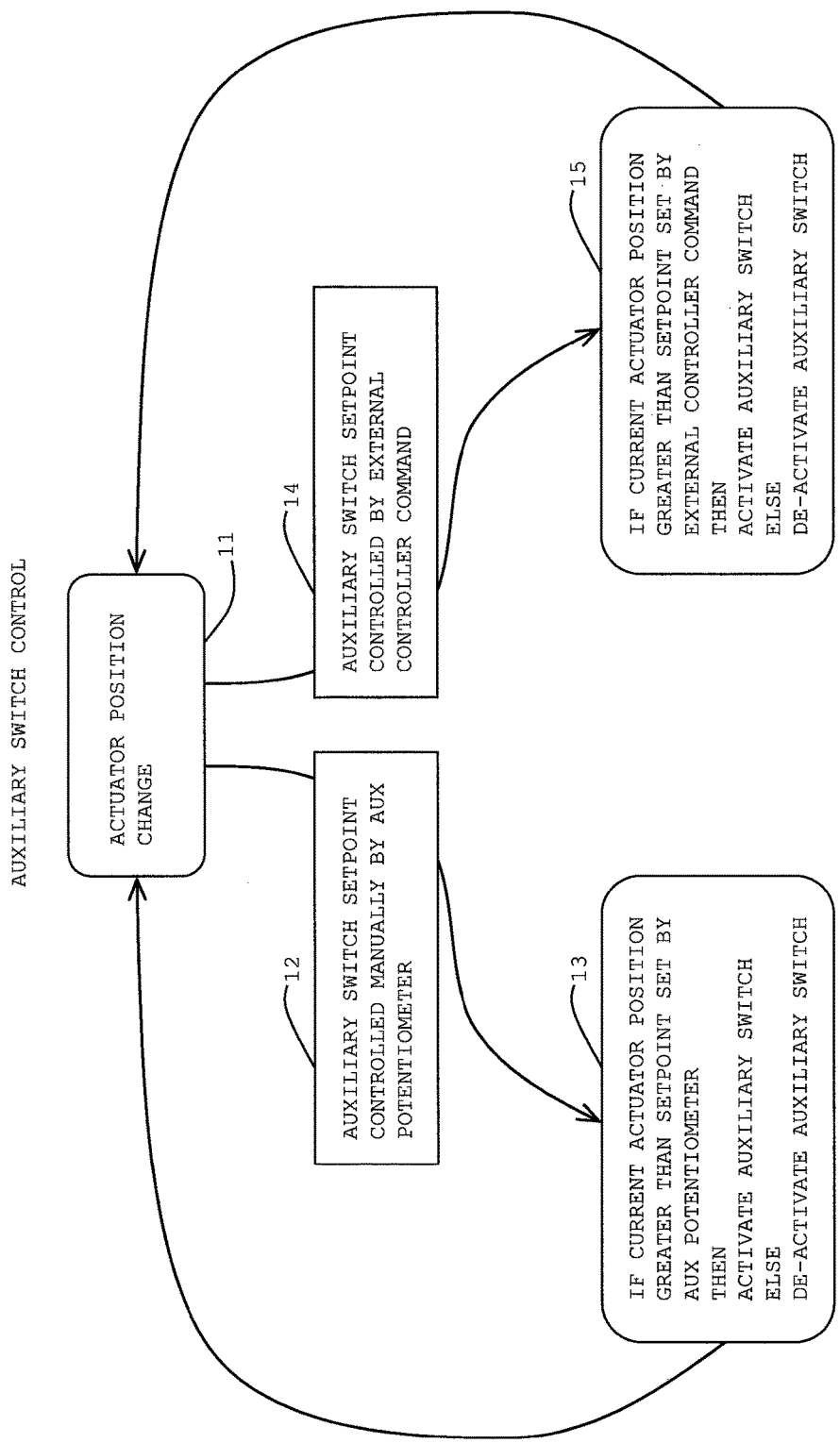
FIG. 3 is a diagram of an auxiliary switch setpoint control approach.

FIG. 3 is a diagram of an auxiliary switch control approach. Symbol 11 may indicate an auxiliary position change which may be initiated. An auxiliary switch setpoint may be controlled manually by an auxiliary potentiometer in symbol 12. Symbol 13 indicates that if the current actuator position is greater than the setpoint set by the auxiliary potentiometer, then the auxiliary switch may be activated. If not, then the auxiliary switch may be deactivated. Alternatively, in symbol 14, the auxiliary switch setpoint may be controlled by an external controller command. Symbol 15 indicates that if the current actuator position is greater than the setpoint set by an external controller command, then the auxiliary switch may be activated. If not, then the auxiliary switch may be deactivated.

A present communicating actuator may have a network adjustable running time. Applications in the field may require or benefit from different running time actuators. In the related art, different running time actuators might be purchased by model number, or programmable actuators may be programmed at commissioning using an independent tool. This situation may dictate that a person pick one running time for the actuator and application at the beginning of an implementation of the actuator.

An example of an issue of running time may occur during system checkout in an OEM factory or in the field. An OEM or field technician may prefer a fast running time (10 seconds) so that the actuator system can be checked out quickly without having to wait for a 90 second actuator to run its time.

The present approach may incorporate an actuator that allows programmable running time via the local bus. Over the bus, the actuator's running time may be programmed to different values at different times during the actuator's lifecycle. For example, the actuator may be programmed for 15 second timing during a test, 30 second timing during a normal application mode, and 90 second timing during a saver mode.

The present actuator approach may be applied in a Jade™ economizer/Sylk Zelix system implementation. The Sylk bus hardware may be implemented on the controller and the actuator. Then the firmware in these products may be created to implement the adjustable running time functionality.

Figure 4:
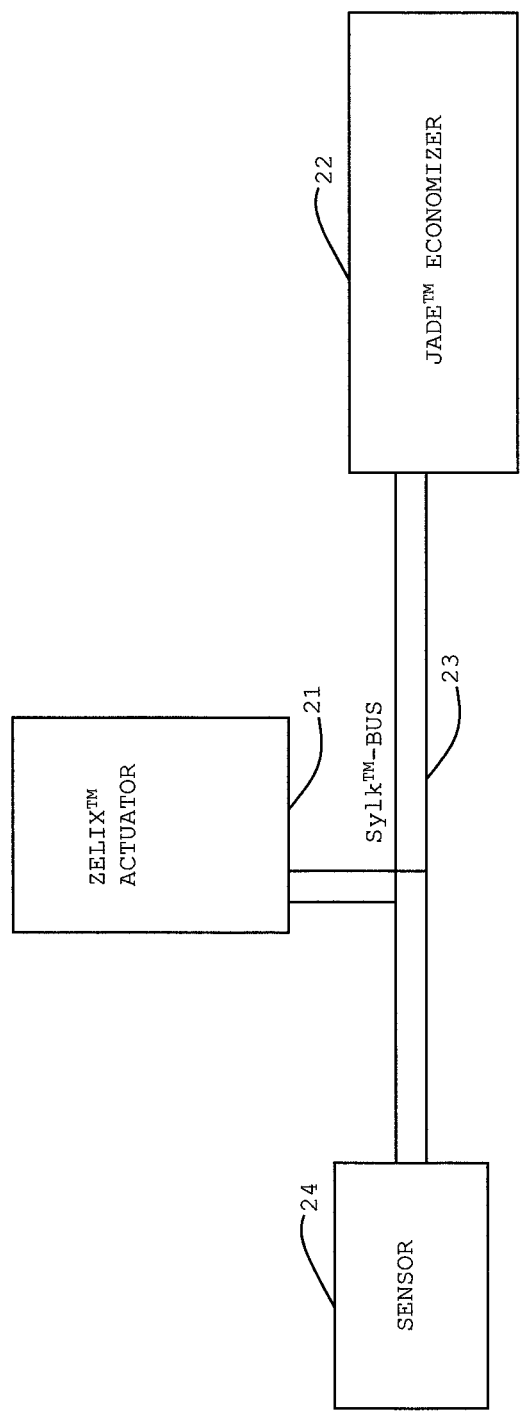
FIG. 4 is a diagram of an actuator, an economizer and sensor connected to one another via a bus.

FIG. 4 is a diagram of a Zelix actuator 21 with Jade economizer 22 connected to the actuator via a Sylk bus 23. A sensor 24 may be connected into the Sylk bus.

A present approach may incorporate a potentiometer address selection for an actuator. Setting a network address on a communicating actuator may be rather difficult. The actuator may be typically located in a hard to reach area (e.g., in a ceiling or behind equipment). Related art approaches may involve actuators that are typically small and hard to see and actuate (e.g., with dip switches/rotary encoders) and may use binary techniques as described herein which may require multiple microcontroller input pins.

The present approach may solve the issue by using a potentiometer to set and establish a network address on a communication actuator. The approach may allow for an address selector to be accessible from both sides of the actuator using a single potentiometer, the numbers and interface to be large and easy to read, and it may allow the address to be selected using only one analog input on the microcontroller.

Figure 5:
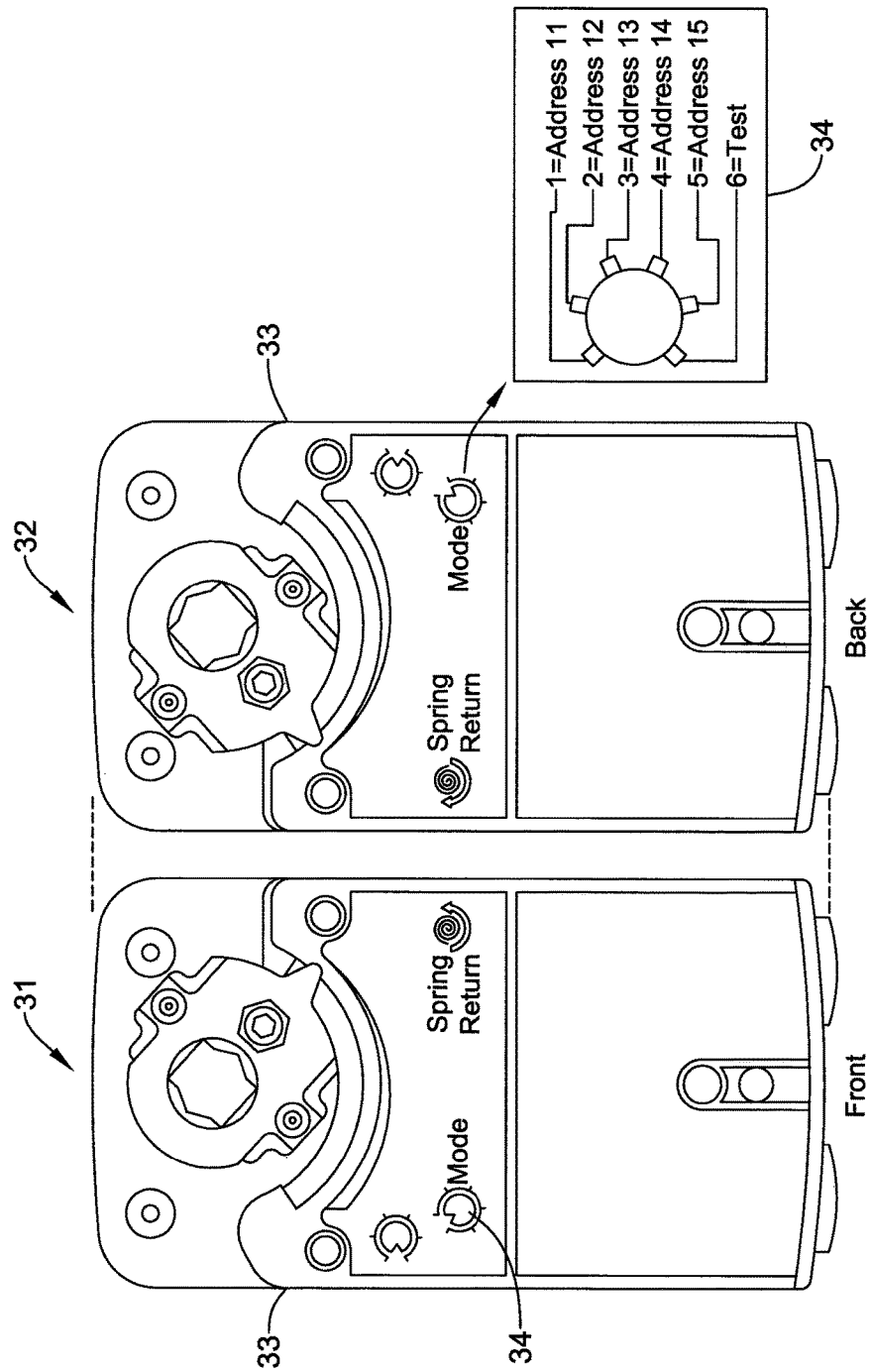
FIG. 5 is a diagram of front and back sides of an actuator revealing certain knobs for control and adjustment such as an address selector being accessible from both sides.

FIG. 5 is a diagram of a front view 31 of an actuator 33 and a back view 32 of the actuator. Certain knobs for control and adjustment such as an address selector 34 may be accessible from both sides of actuator 33. Selector 34 may have five positions for address selection. For instance, a position 1 may be for selecting an address 11, position 2 for address 12, position 3 for address 13, position 4 for address 14 and position 5 for address 15. A position 6 may be for selecting a test mode.

Figure 6:
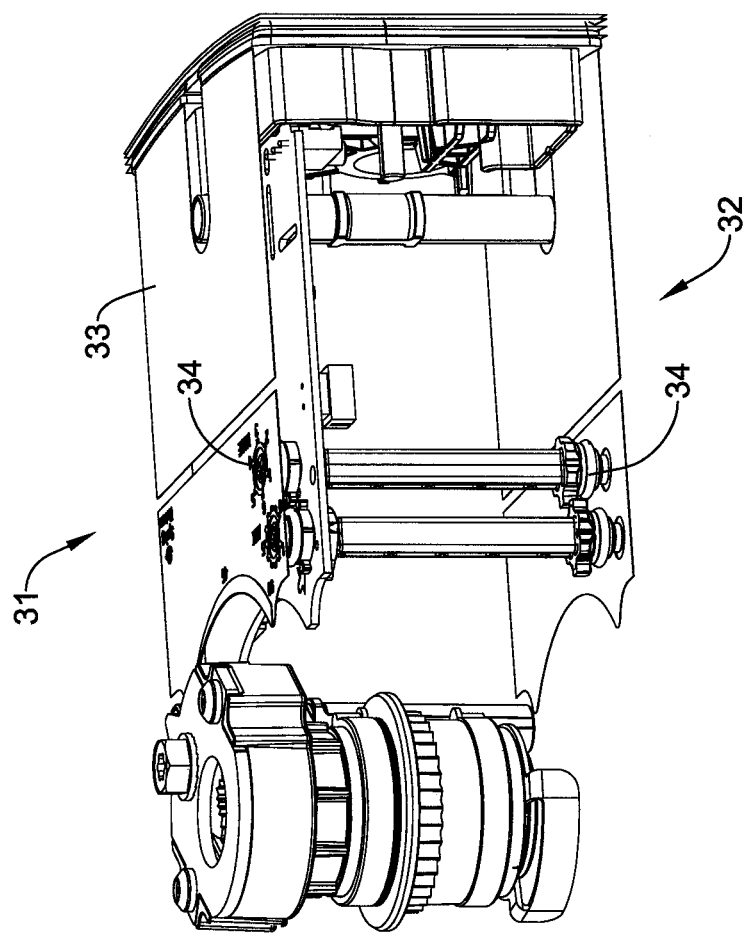
FIG. 6 is a diagram that shows perspective views of two sides of an actuator revealing the reversibility of actuator position for access to a selector from two sides of the actuator.

FIG. 6 is a diagram that shows perspective views of sides 31 and 32 of actuator 33 revealing the reversibility of the actuator for access to selector 34 from both sides of actuator 33.

The present approach may incorporate an actuator which has accessible onboard diagnostics. An issue in the related art may be that actuators in the field can fail or malfunction and of which many cases may be undetected. Such actuators may be wasting energy or giving up comfort for years before the failure is found.

The present approach may solve this issue by communicating alarms, status and diagnostics automatically over a bus. If an actuator fails, an alarm may be sent to the higher order controller for immediate notification. These software alarms and diagnostic features may be implemented in the firmware for a Sylk Zelix communicating actuator.

A controller or processor may provide on the communications bus one or more diagnostics items of a group consisting of high temperature warning, excessive noise on power line, record/report back electromotive force (EMF) on spring return, percentage of life detection, high amount of travel for given amount of time, hunting around a given point, actuator angle, communication normal indicator, stroke limiting, control valve (Cv) selection, flowrate on pressure independent control valve (PIC-V), set auxiliary switch, report auxiliary switch setting, report auxiliary switch status, report auxiliary switch current draw—auxiliary equipment status, if switch drives fan—verify fan shuts down before damper closes, if switch drives coils—verify heat exchanger running before opening/closing valve, report stuck valve/damper, PIC-V constant pressure—constant torque, changeover valve—no cycling for a period of time, time since last movement, date/time of first operation (commissioning), audible/detectable signal for location, device in warranty, device model number/serial number/date code, device type—outside air damper/standard ball valve/PIC-V valve/mixed air damper, actuator fitness/self-test routine—known system conditions, sensor—actual damper/valve position, super capacitor status, and energy consumption.

The present approach may incorporate an actuator test mode. There may be several approaches used by an actuator installer to verify that an actuator has been installed correctly. One approach may involve an operator at the control panel to cause the actuator to open and close. In another approach, the installer or maintainer may have access the connector and short the modulating input to cause the actuator to open, thus verifying that the actuator is working and connected properly.

With the test mode, there may be a test mode selection on a pot or switch that causes the actuator to move to its open position. An installer or maintainer may then just select Test Mode via the pot and verify an operation of the actuator without needing to access the connector or to communicate with a control operator.

Actuator software may verify that the test mode has been selected on the switch or potentiometer. The software may then exercise the following algorithm.

IF Test Mode THEN
Set actuator speed to maximum allowable speed
Cause actuator to open (move to end of its allowable span)
Remain in this position while in Test Mode.

Figure 7:
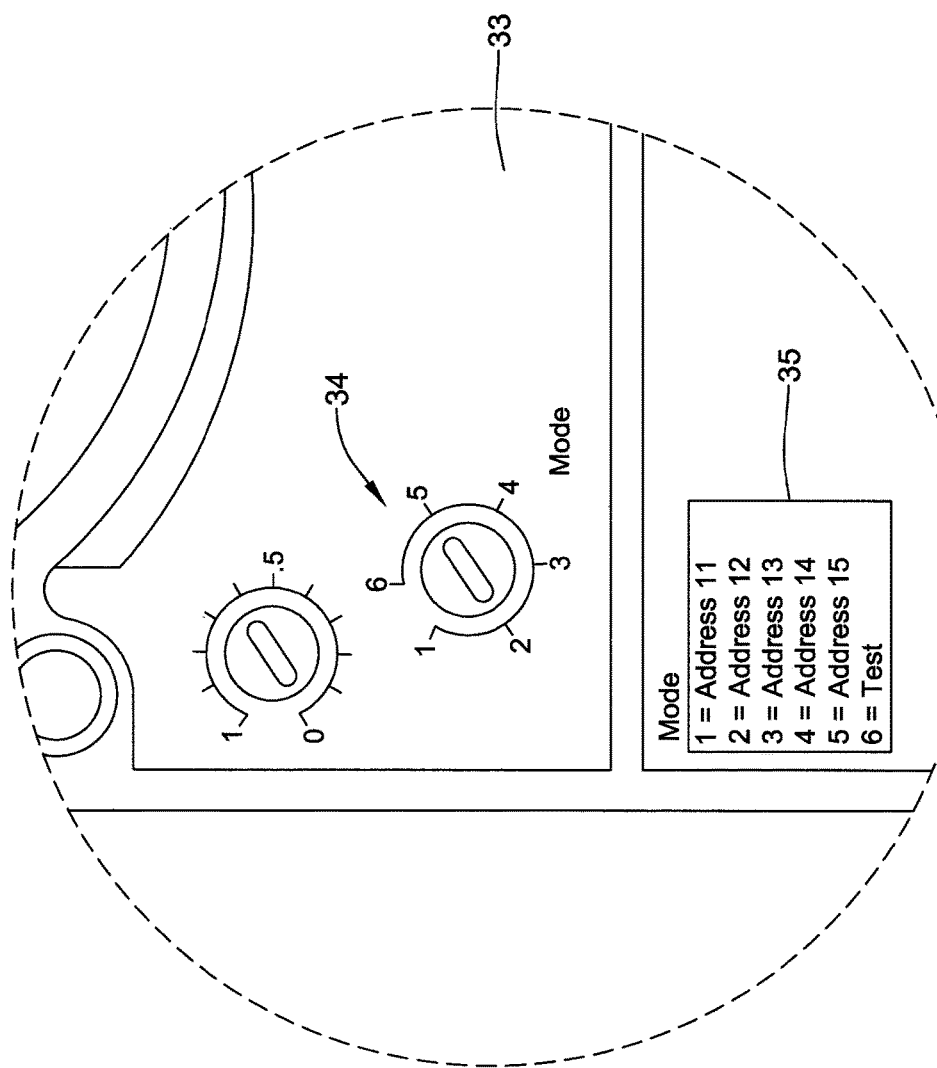
FIG. 7 is a diagram of a close view of a selector or mode switch showing positions available for a test mode and addresses of an actuator.

FIG. 7 is a diagram of a closer view of the selector or mode switch 34, showing 6 positions available for the test mode of actuator 33. A mode plate 35 indicates that position 6 may be designated for "Test" or test mode. Positions 1-5 indicate five different addresses available for selection by switch 34.

Figure 8:
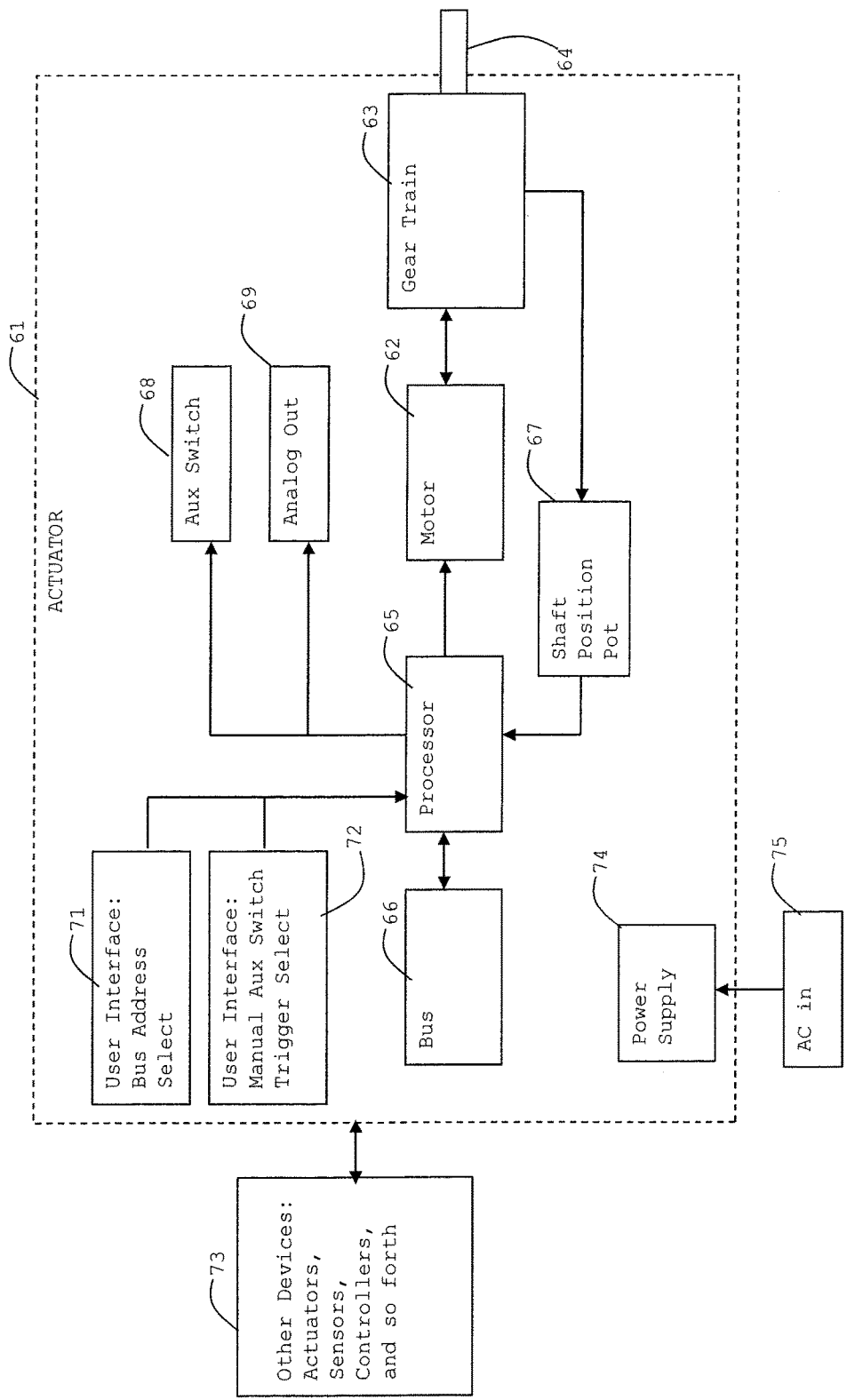
FIG. 8 is a diagram of a two-wire polarity-insensitive bus controlled actuator.

FIG. 8 is a diagram of a two-wire polarity-insensitive bus (i.e., Sylk) controlled actuator 61. An electric motor 62 may drive a gear train 63 which turn an actuator shaft 64 which may move a damper, valve, or other component. A processor 65 may be connected to motor 62 and provide control of the motor. Processor 65 may also be connected to a communications bus 66. A shaft position potentiometer 67 may be mechanically connected to the actuator shaft 64 or a part on the gear train to electrically provide a position of shaft 64 to processor 65. An auxiliary switch output 68 and an analog output 69 may be provided by processor 65. A user interface 71 may provide a bus address select to processor 65. A user interface 72 may provide a manual auxiliary switch trigger select. Actuator 61 may be connected to other devices 73 such as actuators, sensors, controllers, and so on. Actuator 61 may have a power supply 74 to power its components. An AC power line 75 or other source may provide power to supply 74.

Figure 9:
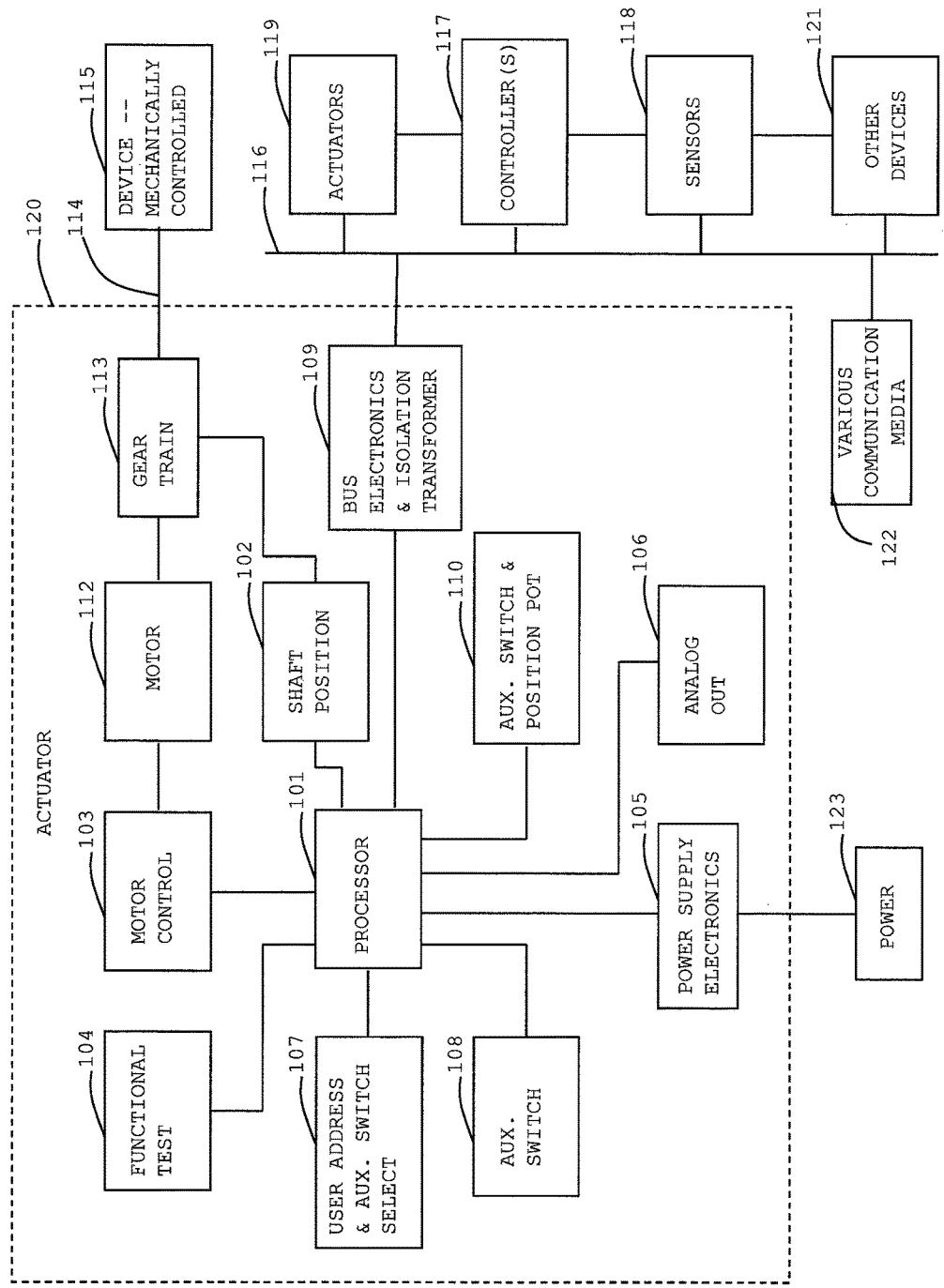
FIG. 9 is diagram of another layout of another actuator.

FIG. 9 is a diagram of an actuator 120. Many components of actuator 120 are revealed in the diagrams shown in FIGS. 10a through 10r. Interconnections of the components may be indicated in the diagrams as identified by various connections and wires having labels and alphanumeric symbols. For example, a line identified as A1 in FIG. 10a may be connected to a line identified as A1 in FIG. 10b. A processor 101 may be connected to power supply electronics 105, bus electronics and isolation transformer 109, a motor control 103 and a shaft position indicator 102. Processor 101 may also be connected to an auxiliary switch 108, an auxiliary switch and position potentiometer 110, and a user address and auxiliary switch selector 107. Further, processor 101 may be connected to an analog out 106 and functional test electronics 104.

A motor 112 may be connected to motor control 103. An output of motor 112 may be mechanically connected to a gear reduction train 113. Gear train 113 may have an actuator coupling or shaft 114 for connection to a mechanically controlled or operated device 115 such as, for example, a damper, valve, flap, louver, and so on. Gear train 113 may be connected to shaft position indicator 102.

Bus electronics and isolation transformer 109 may be connected to a communications bus 116. Outside actuator 120, bus 116 may be connected to controllers 117, sensors 118, actuators 119, and other devices 121 and various communication media 122. An outside power source 123 may be connected to power supply electronics.

Figure 10A:
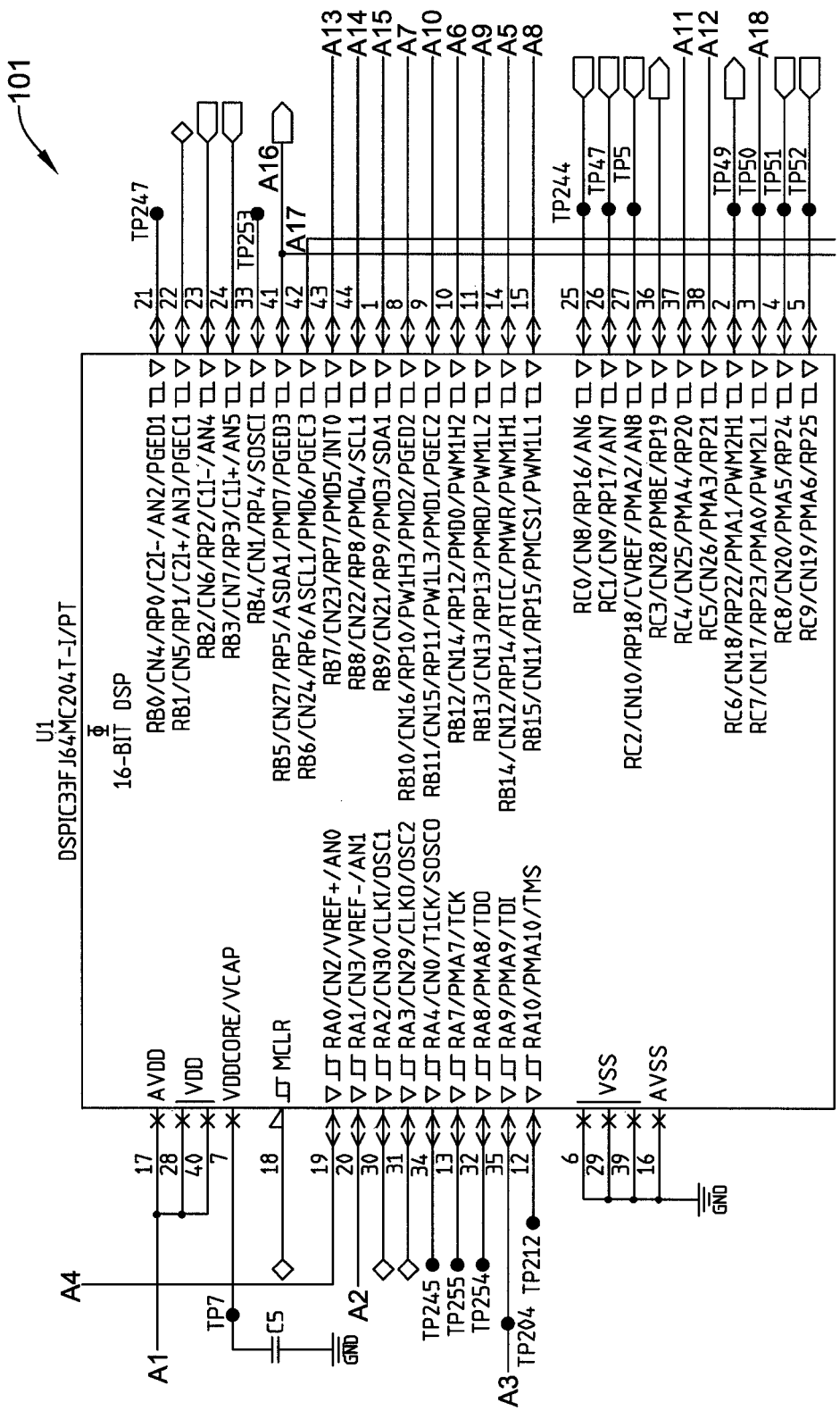
FIGS. 10a through 10r are schematics of circuitry for the actuator as represented by FIG. 9.
Figure 10B:
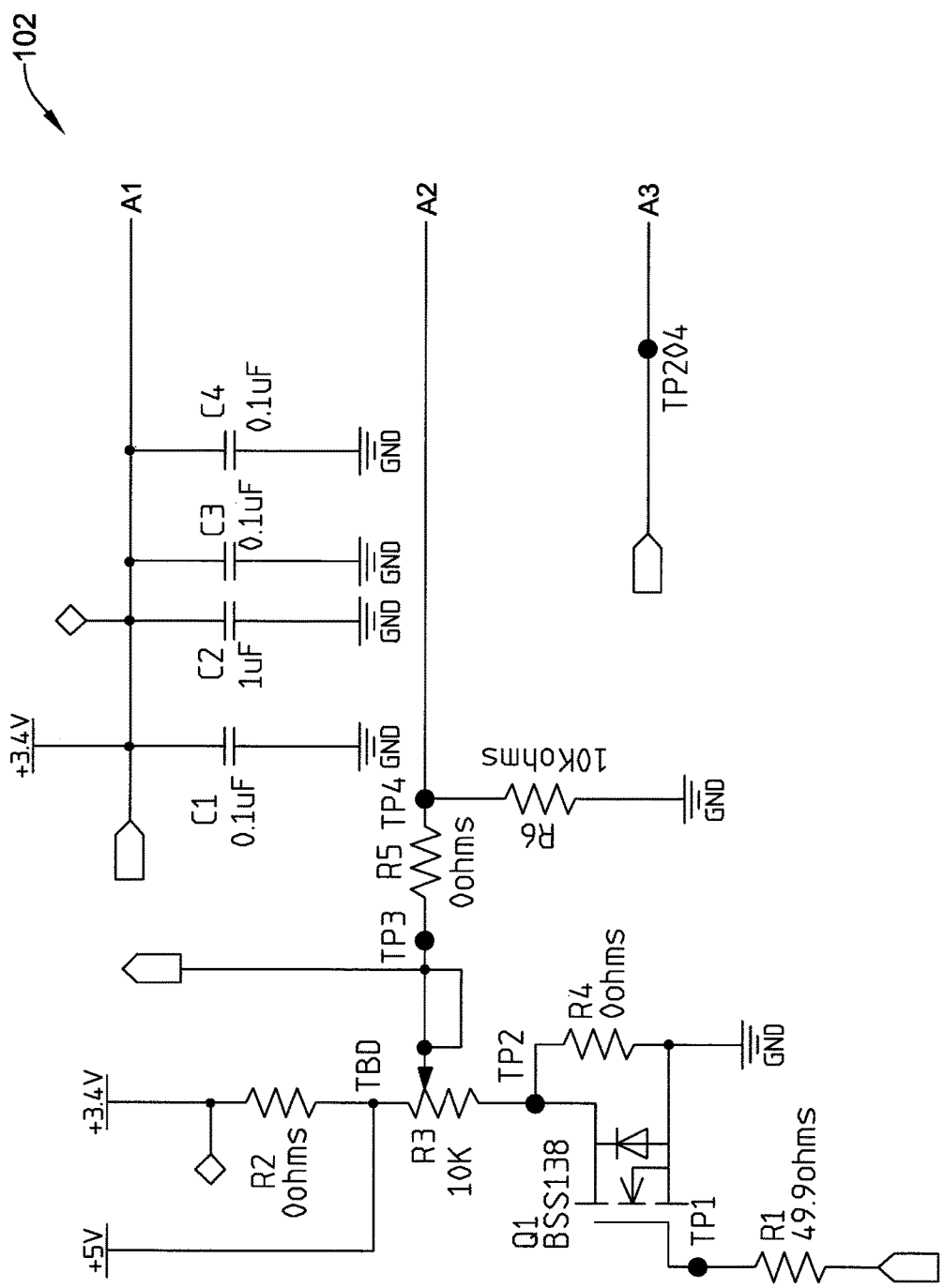
Figure 10C:
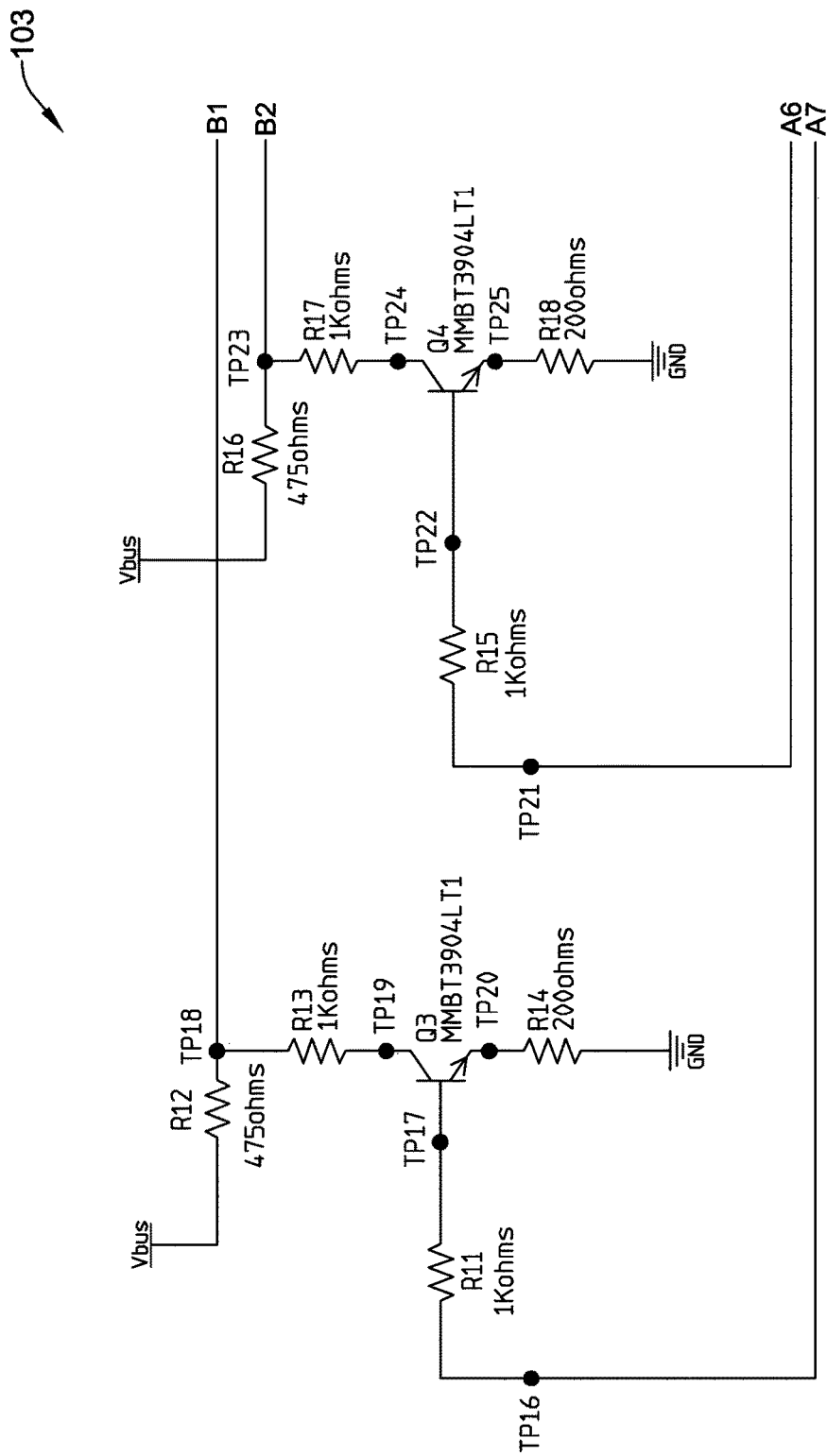
Figure 10D:
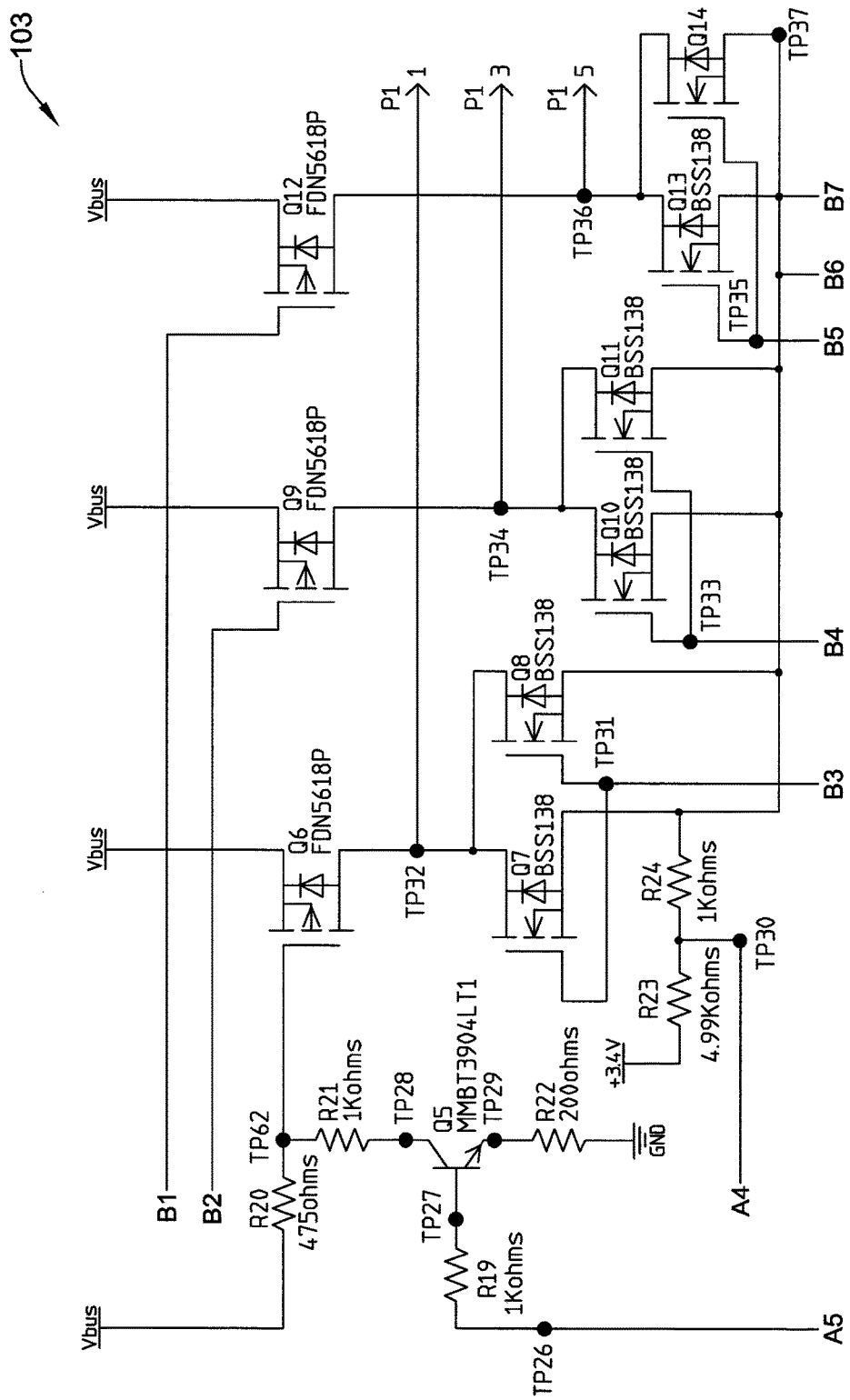
Figure 10E:
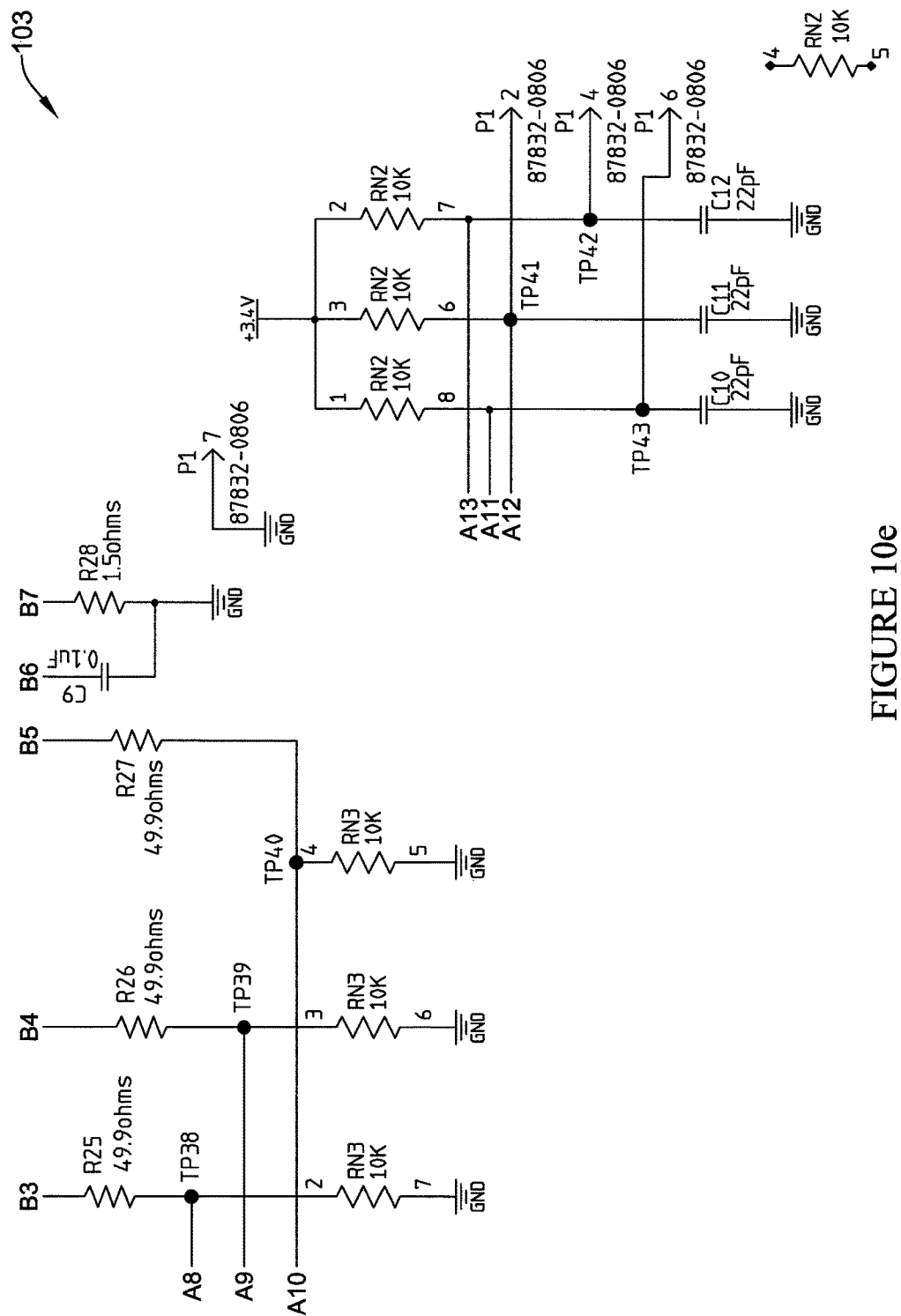
Figure 10F:
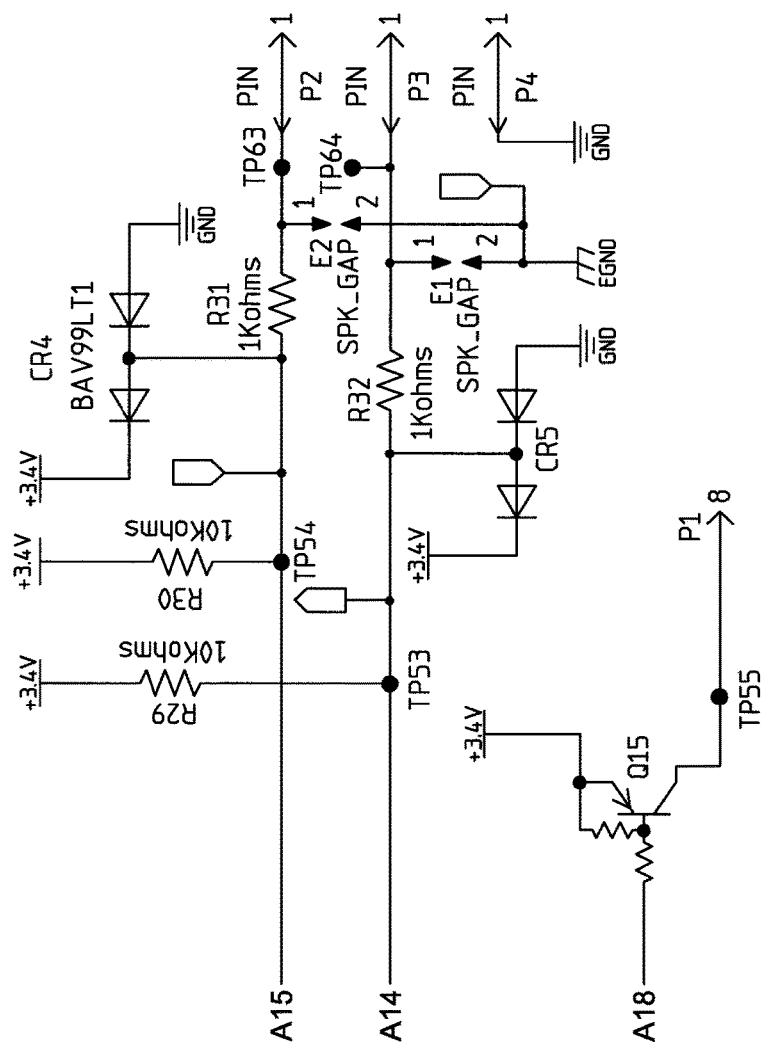
Figure 10G:
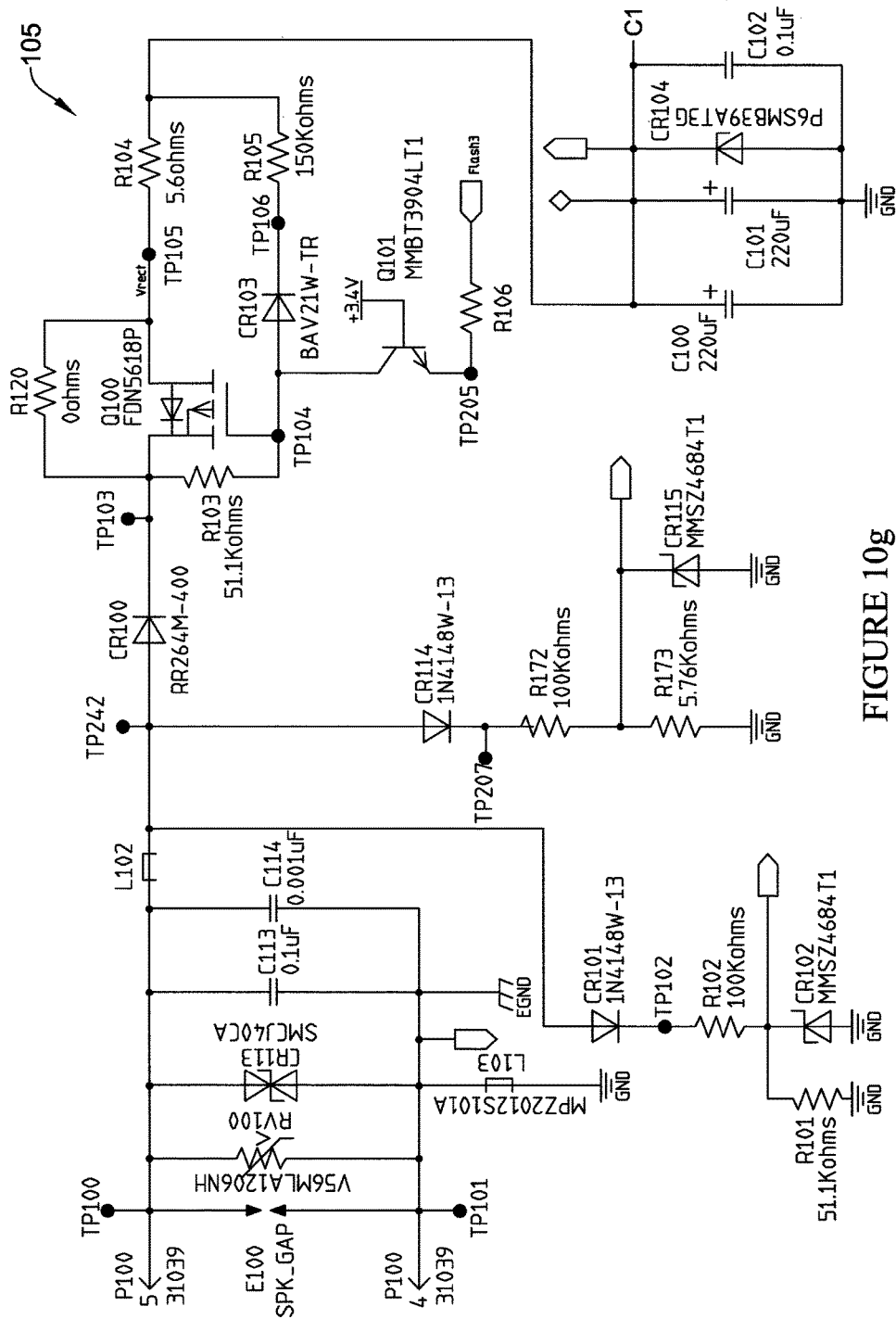
Figure 10H:
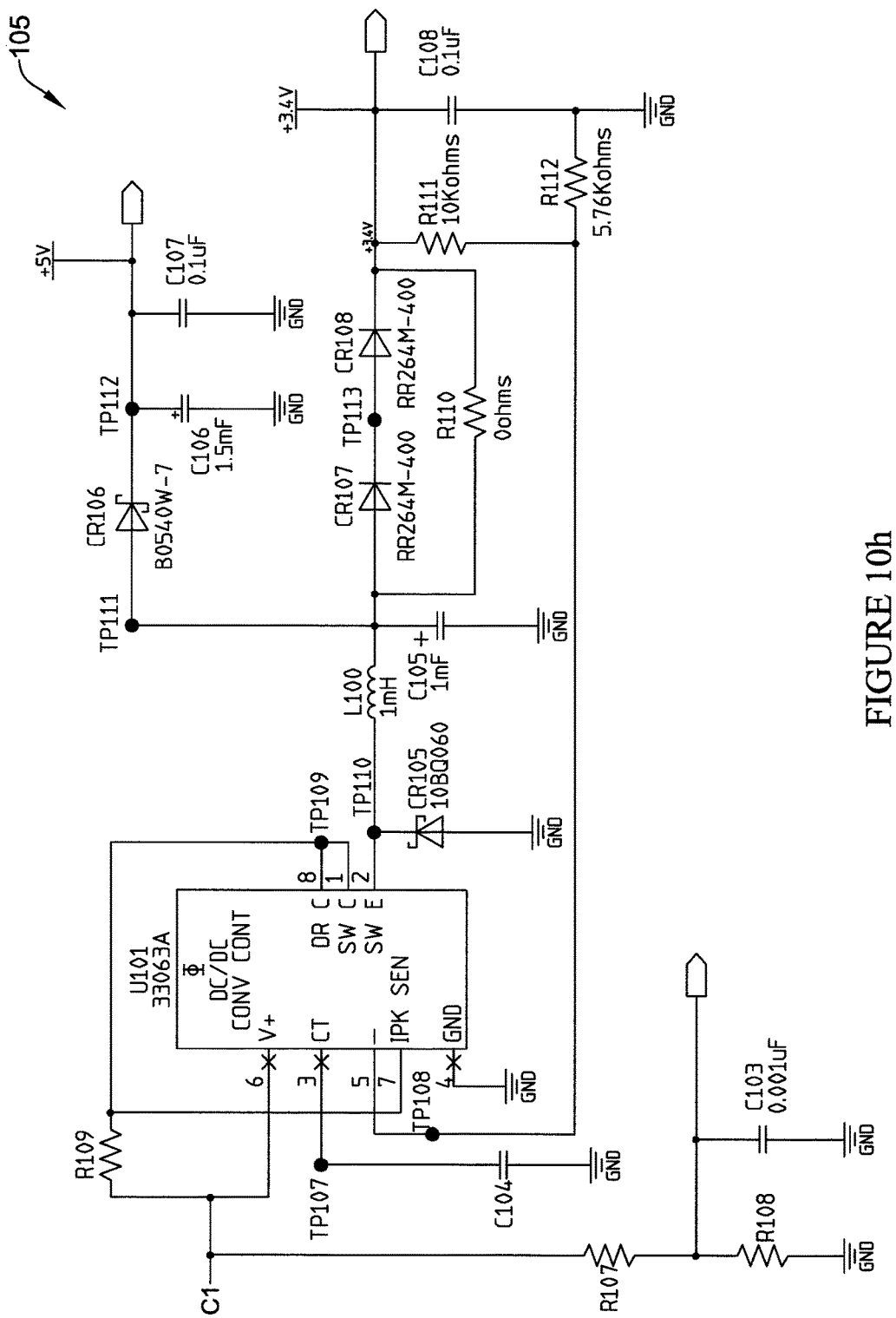
Figure 10I:
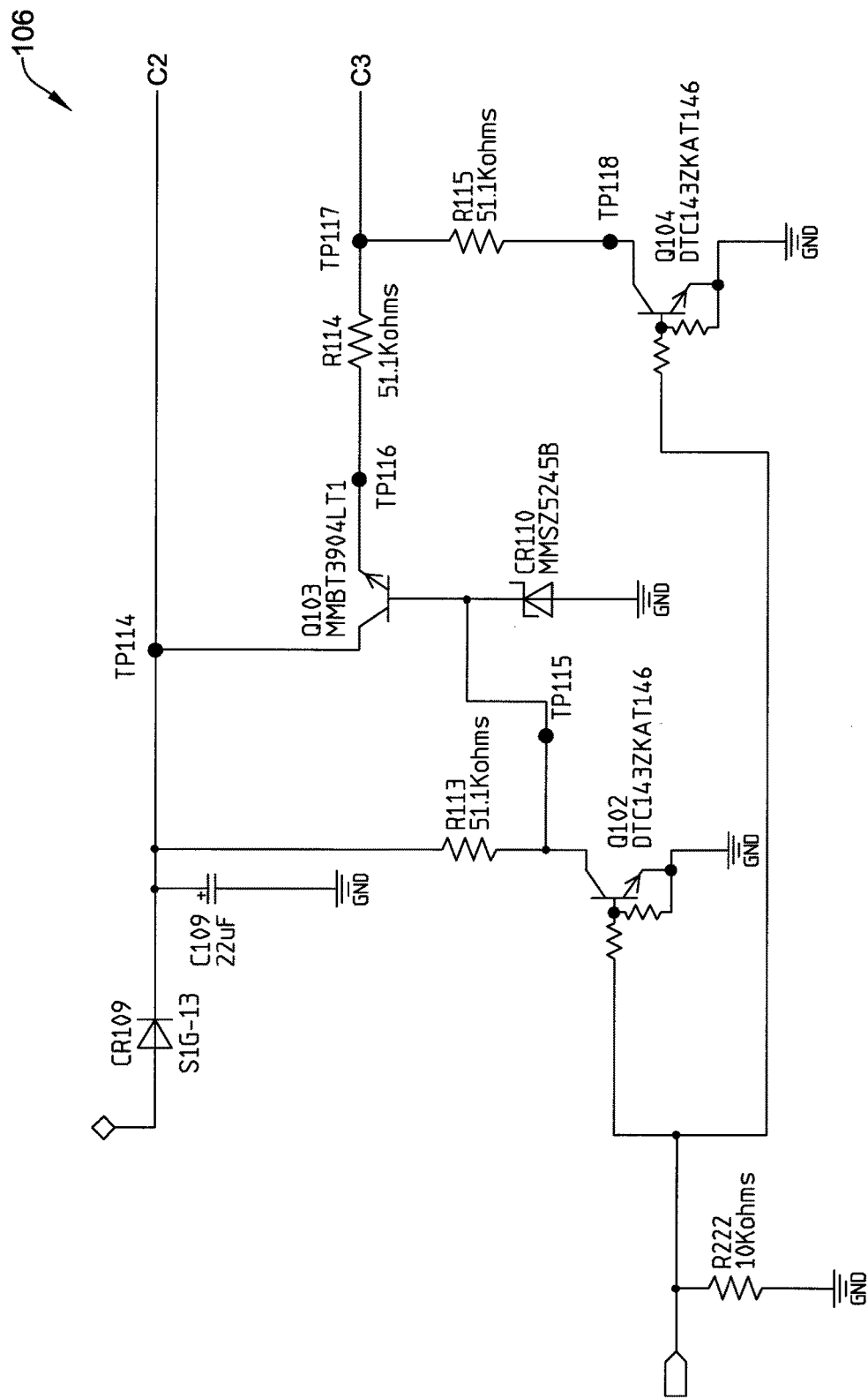
Figure 10J:
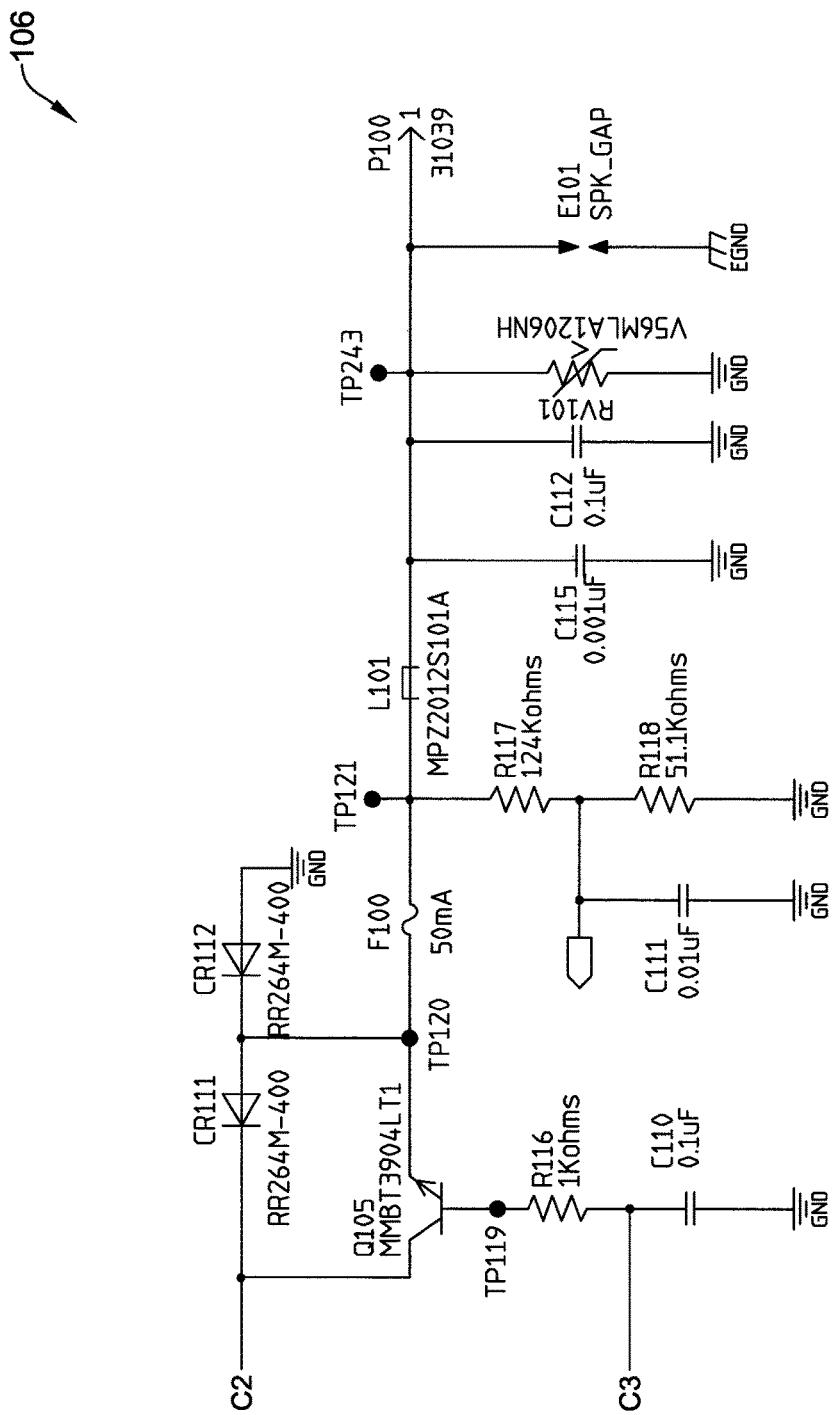
Figure 10K:
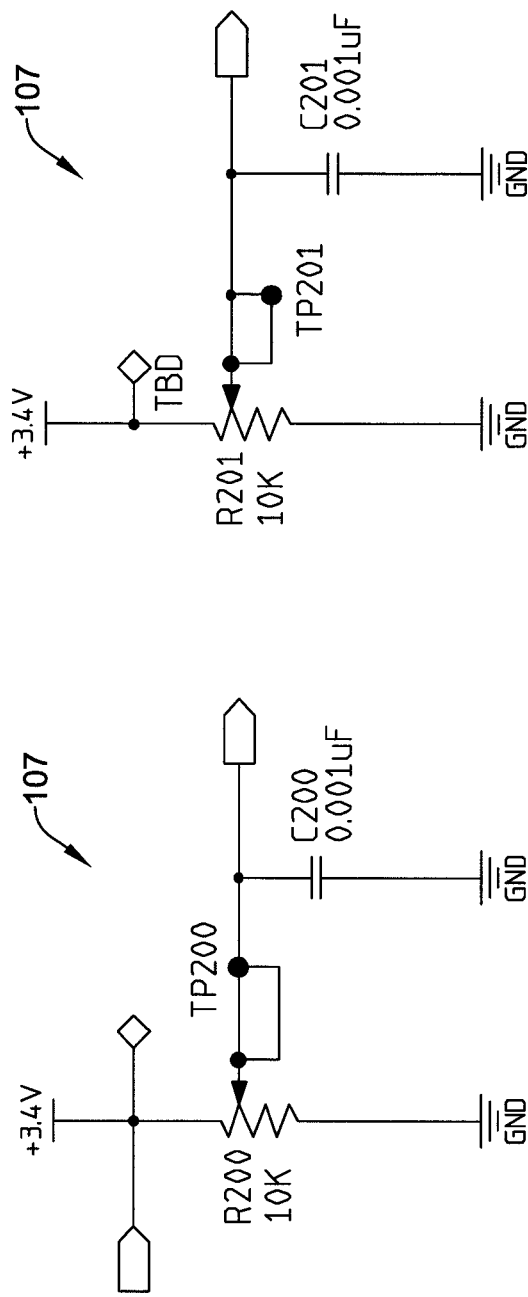
Figure 101:
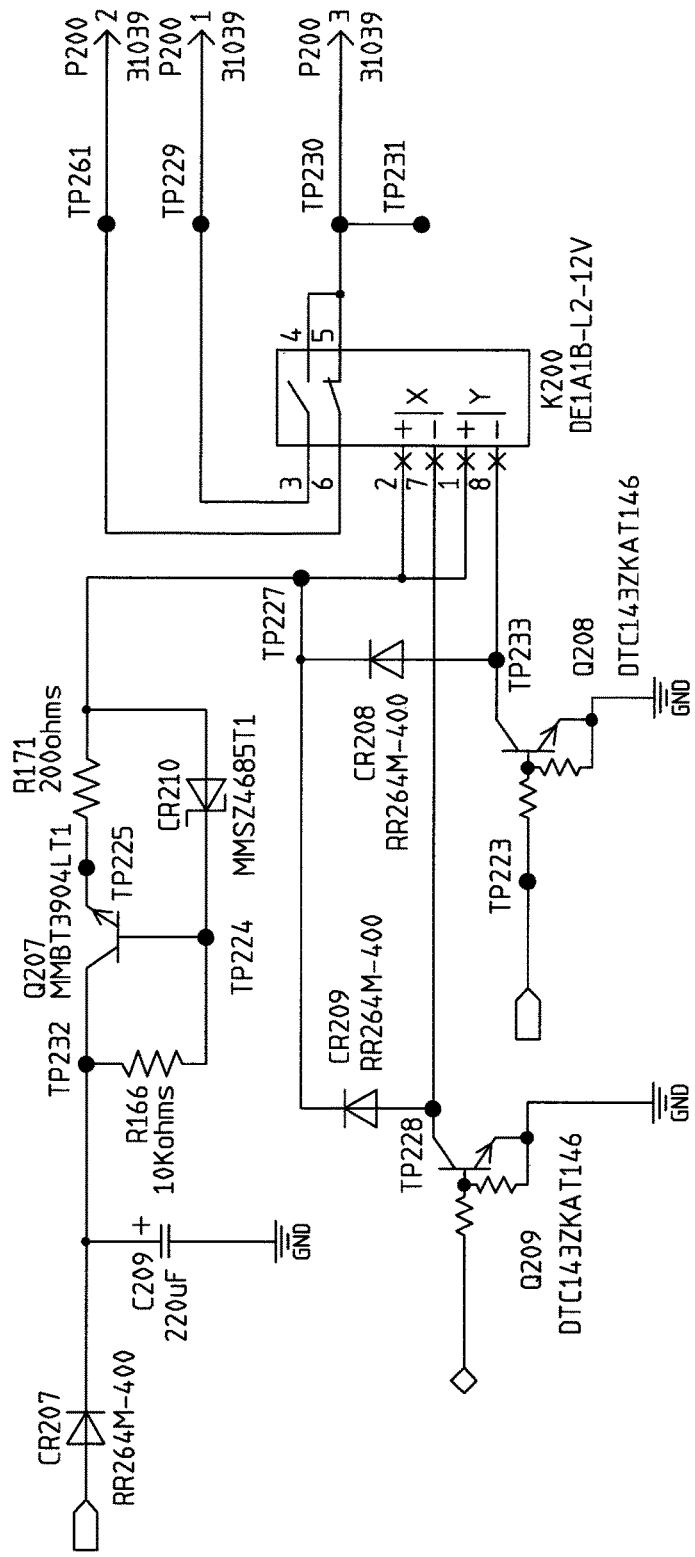
Figure 10M:
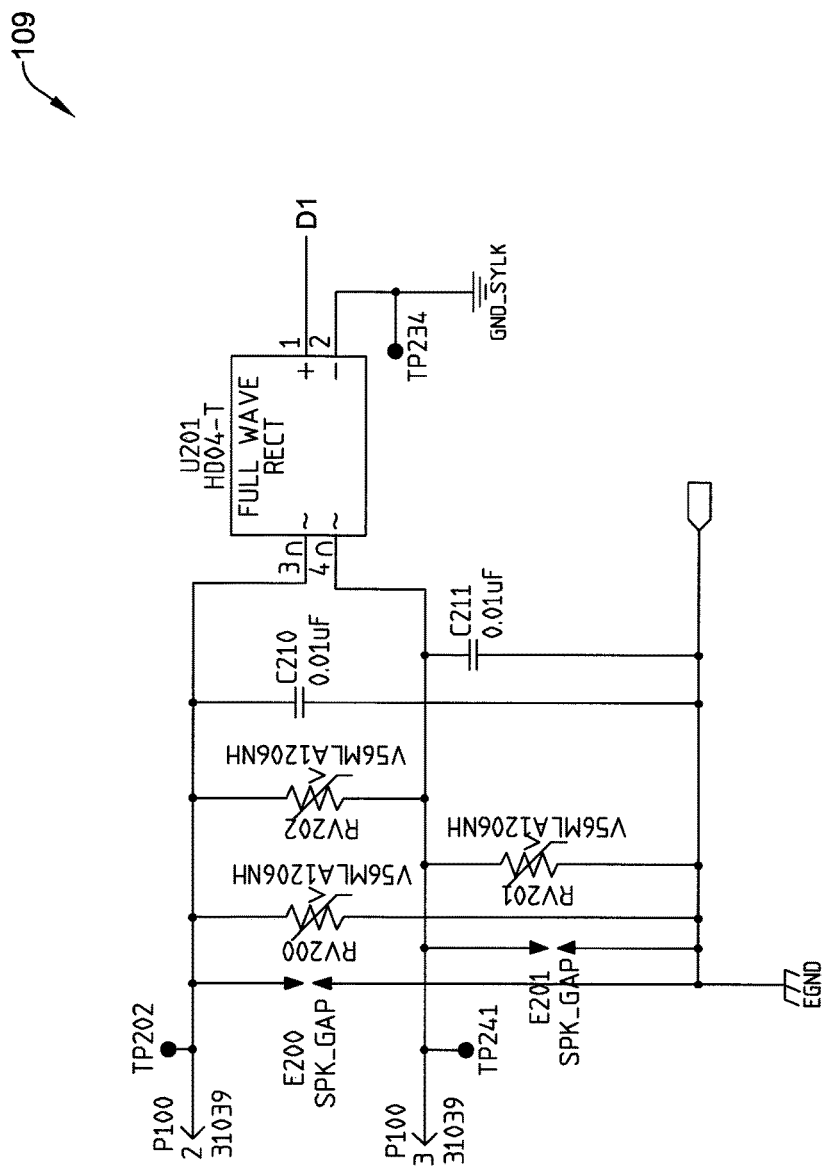
Figure 10N:
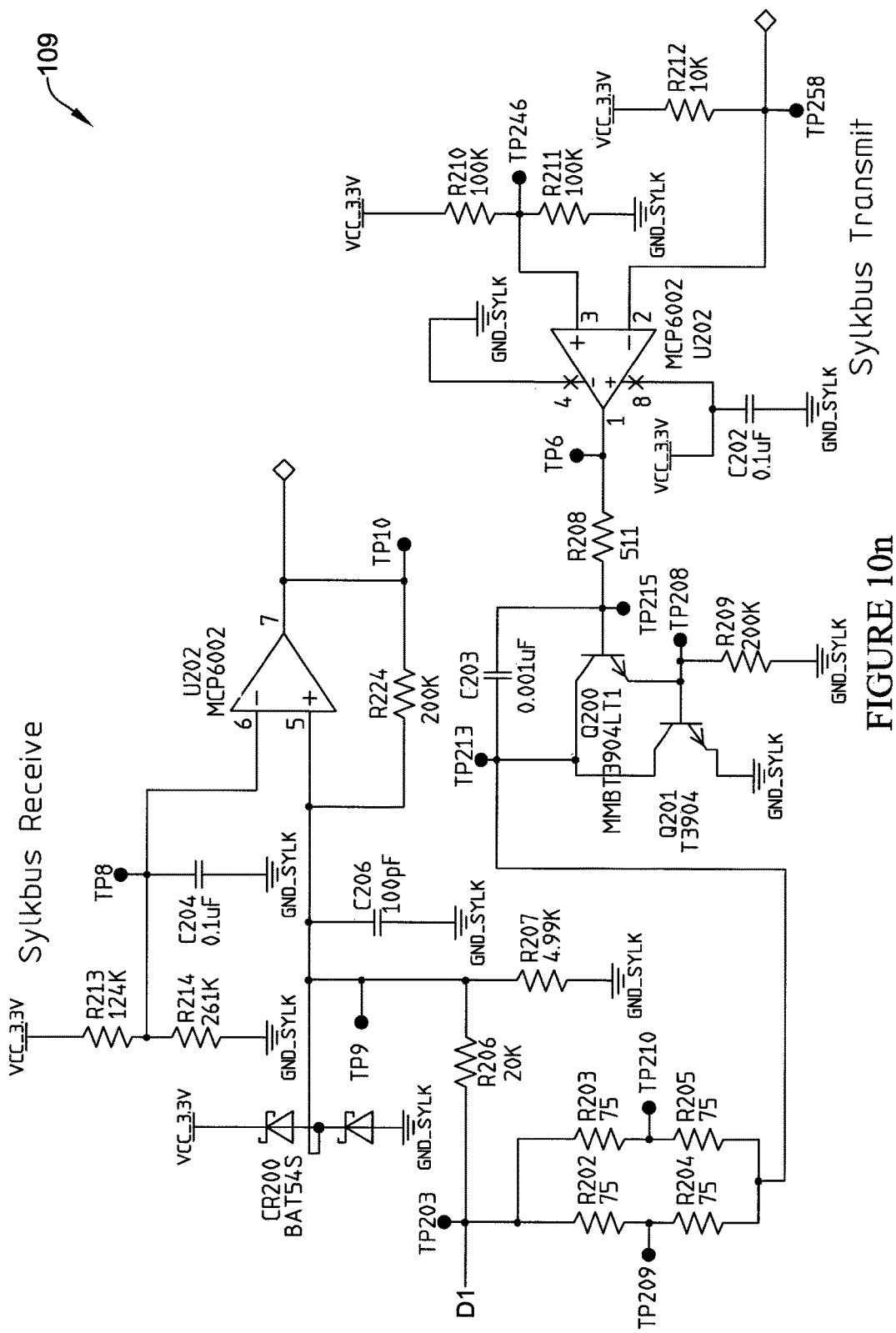
Figure 10O:
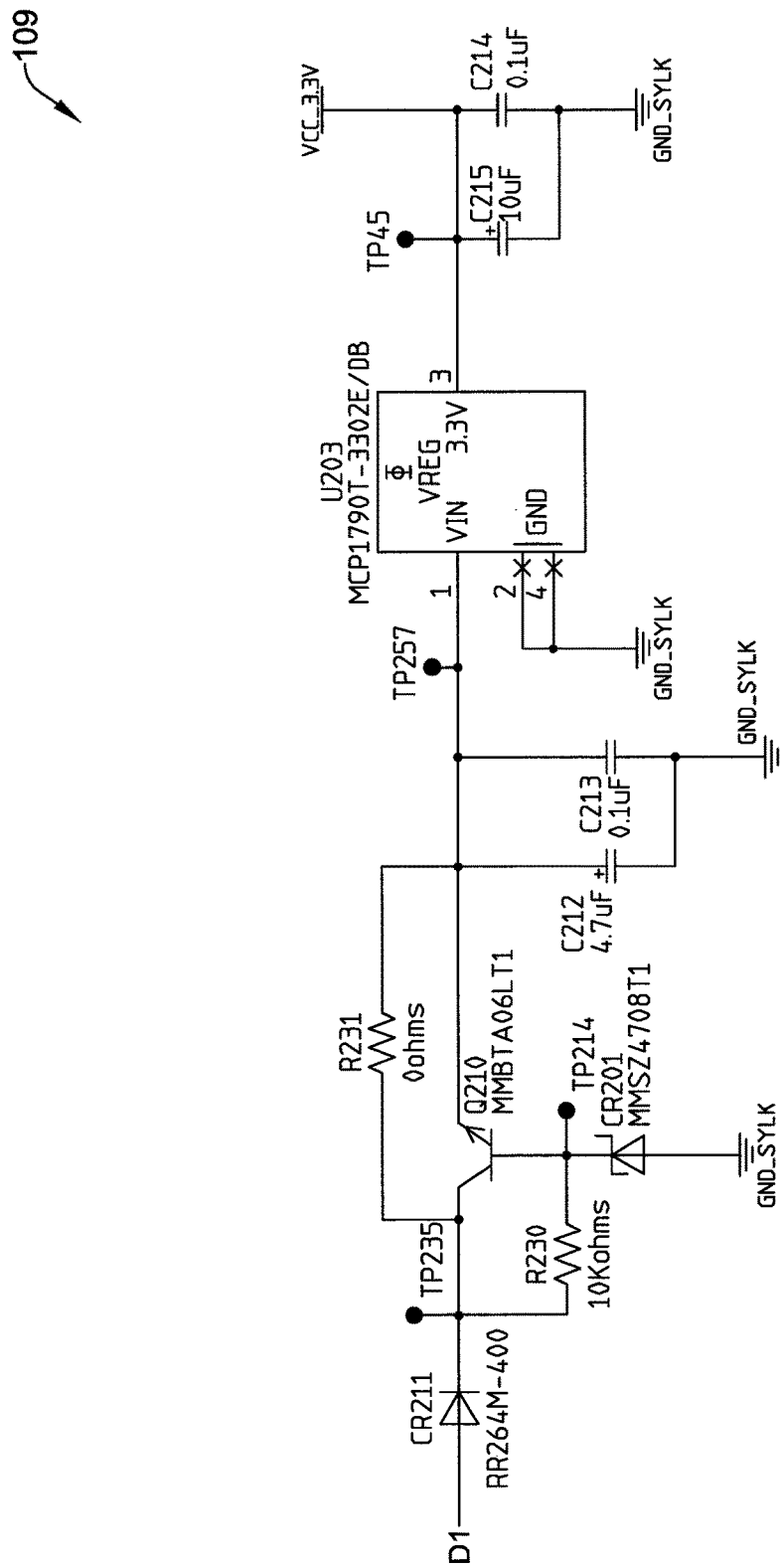
Figure 10P:
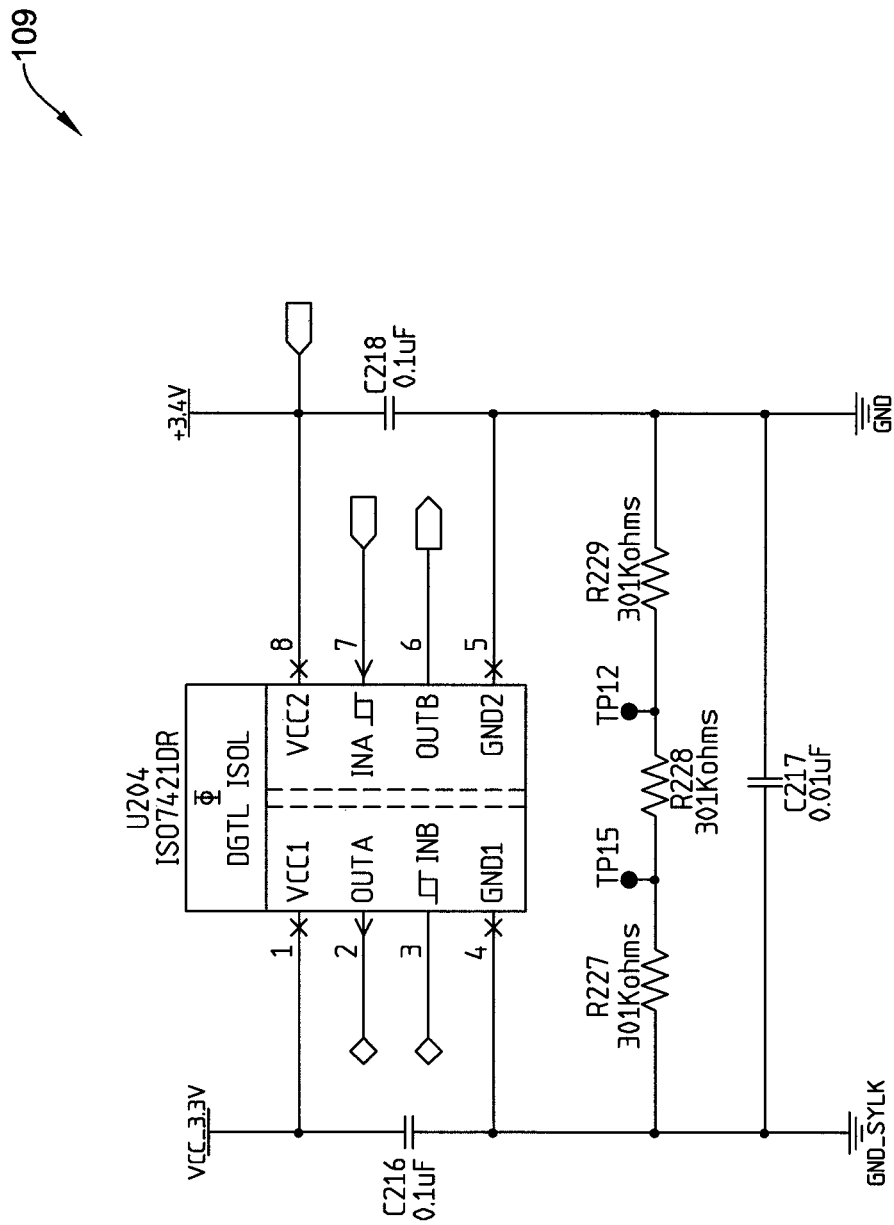
Figure 10Q:
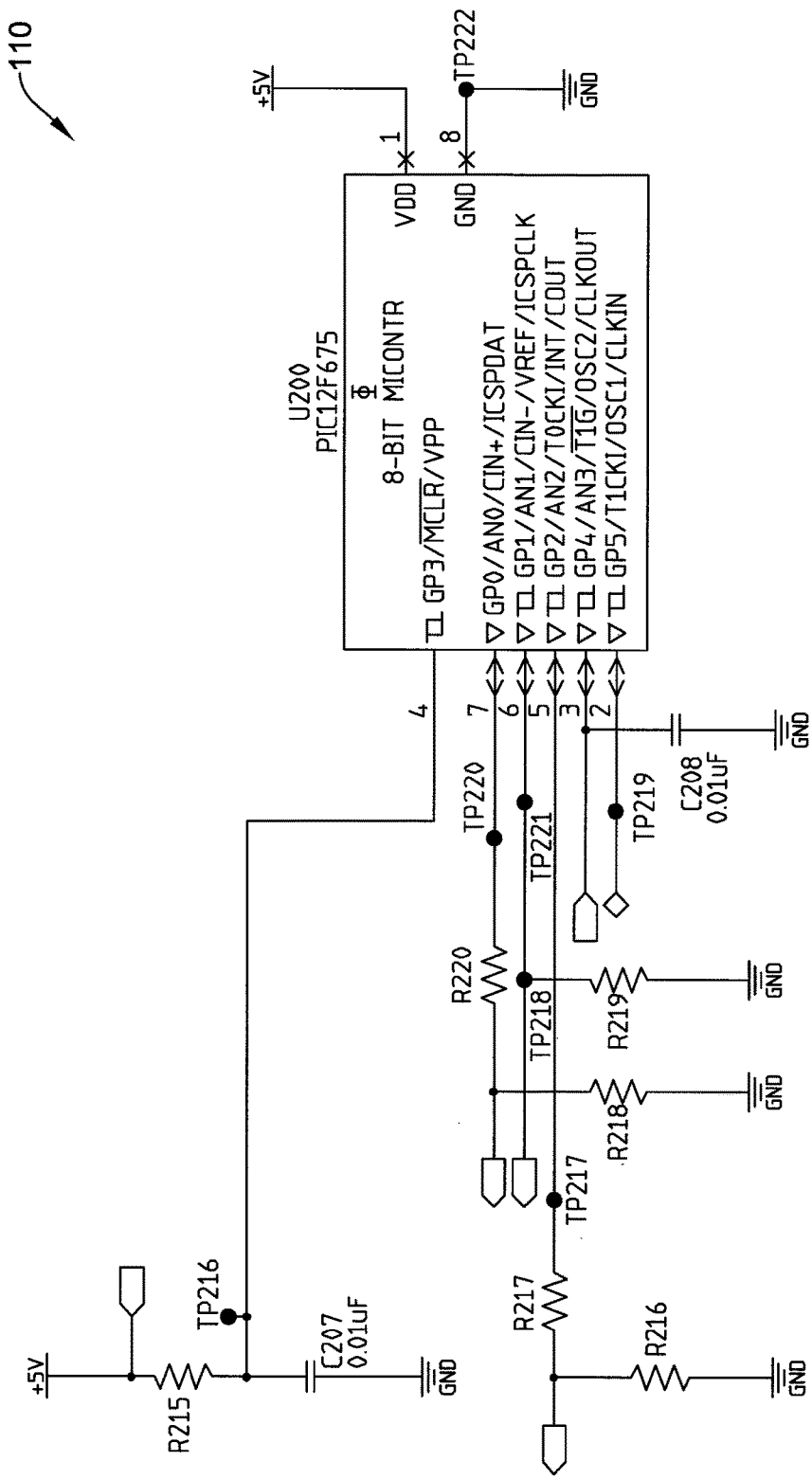
Figure 10R:
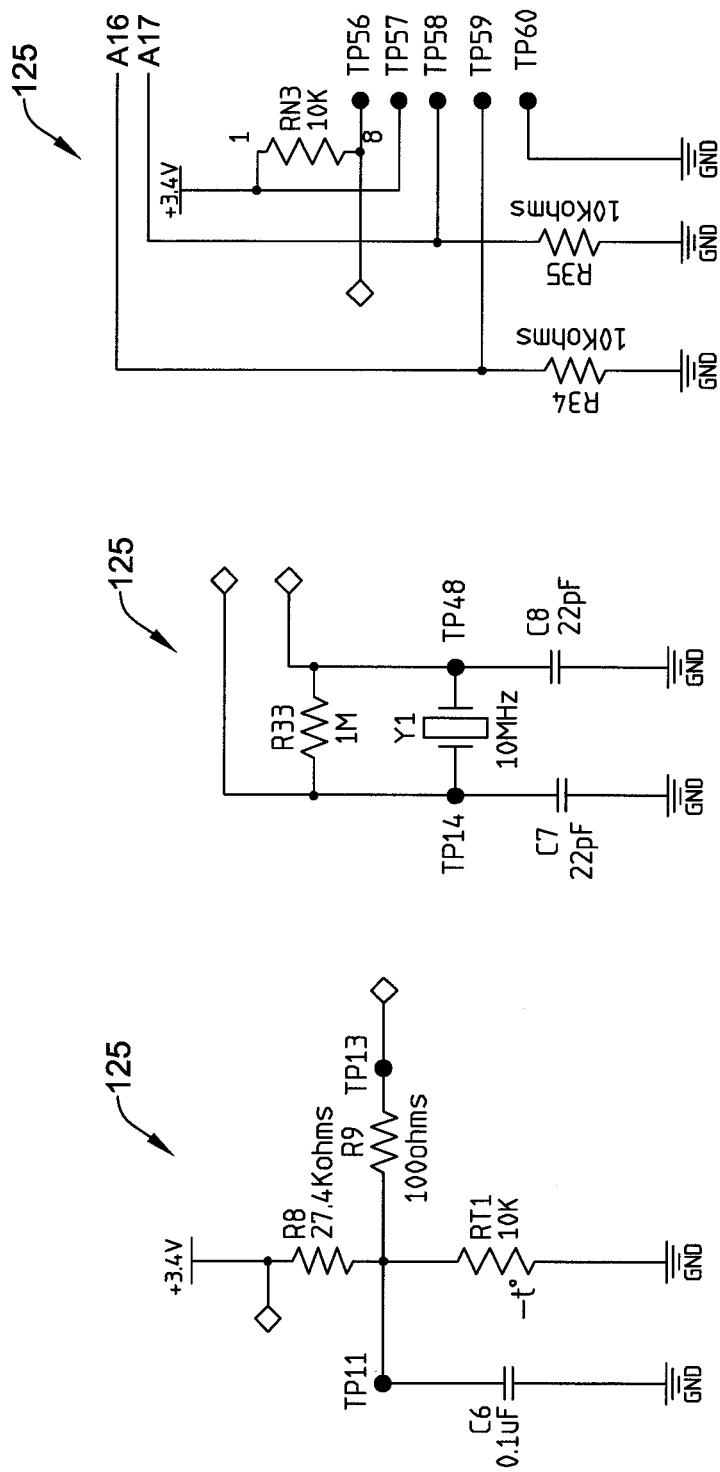

Processor 101 may be shown in a diagram of FIG. 10a. Shaft position indicator 102 may be shown in a diagram of FIG. 10b. Motor control 103 may be shown in diagrams of FIGS. 10c, 10d and 10e. Functional test electronics may be shown in a diagram of FIG. 10f. Power supply electronics may be shown in diagrams of FIGS. 10g and 10h. Analog out electronics 106 may be shown in diagrams of FIGS. 10i and 10j. User address and auxiliary switch circuitry 107 may be shown in diagrams of FIG. 10k. Auxiliary switch circuitry 108 may be shown in a diagram of FIG. 10l. Communications bus electronics 109 may be shown in diagrams of FIGS. 10m, 10n, 10o and 10p. Auxiliary switch and position potentiometer circuitry 110 may be shown in a diagram of FIG. 10q. Miscellaneous circuitry 125, such as thermistor, oscillator and flash electronics may be in diagrams of FIG. 10r. Some of the other Figures noted herein may show diagrams of other portions of circuitry helpful in building the actuator system.

The following is a recap of the present actuator system. An actuator system for a heating, ventilating and air conditioning system, may incorporate a motor, a gear train mechanically connected to the motor and having an HVAC actuator shaft, a processor connected to the motor, and a shaft position indicator connected to the gear train and to the processor. The actuator shaft may be rotatable a first number of degrees from a first position to a second position and a second number degrees from a third position to a fourth position. A time for the actuator shaft to rotate the first number of degrees from the first position to the second position may be a first running time. A time for the actuator shaft to rotate the second number of degrees from the third position to the fourth position may be a second running time. The first and second running times may be separately adjustable. The first position may be a closed position, the second position may be an open position, the third position may be the open position, and the fourth position may be the closed position. The running times may be adjusted with signals to the processor.

The actuator system may further incorporate a communications bus connected to the processor, and a controller connected to the communications bus. The first and second running times may be separately adjustable with entries put into the controller. Signals representative the entries may be sent from the controller to the processor via the communications bus.

One or more of the first and second running times may be adjusted in real-time at the controller. A test mode entry into the controller may cause the one or more of the first and second running times to be set for testing. The first and second running times may be set to be different from each other. The communications bus may convey the signals with two polarity-insensitive wires.

An approach for adjusting running times in an actuator associated with a heating, ventilating and air conditioning system, may incorporate providing an HVAC actuator having a motor, a gear train connected to the motor and an actuator shaft connected to the gear train, and entering signals into a processor for adjustments of a speed of the motor and thus adjustments of a first running time of the actuator shaft in a first direction from a first position to a second position and a second running time of the actuator shaft in a second direction from a third position to a fourth position. The actuator shaft may be connected to an apparatus in the heating, ventilating and air conditioning system.

The approach may further incorporate making entries into a controller to provide signals, representative of adjustments to one or more of the first and second running times, via a communications bus to the processor for adjustments of the speed of the motor and thus adjustments of one or more of the first and second running times of the actuator shaft.

The approach may further incorporate obtaining adjustments of the one or more of the first and second running times of the actuator shaft in real-time with entries made at the controller. The approach may further yet incorporate selecting a test mode at the controller. Selecting the test mode may result in adjustments of the one or more of the first and second running times of the actuator shaft for testing purposes. The communications bus may convey the signals with two polarity-insensitive wires. The approach may also further incorporate selecting at the controller a mode from a plurality of modes. Each mode of the plurality of modes may be programmed to provide a first running time and a second running time.

An actuator system for a heating, ventilating and air conditioning system, may incorporate a motor, a gear train mechanically connected to the motor, an HVAC actuator shaft mechanically coupled to the gear train, and a processor connected to the motor. The processor may set running times of the motor. A running time of the motor may be an amount time that the actuator shaft moves from one position to another position.

A first running time of the motor may be an amount time that the actuator shaft moves from a first position to a second position as driven by the motor via the gear train. A second running time of the motor may be an amount of time that the actuator shaft moves from a second position to a first position as driven by the motor via the gear train. For example, the first position may be a closed position, and the second position may be an open position.

A test running time may be less than a saver running time, and a saver running time may be greater than a normal running time. Running times of the motor may be entered at a controller which sends signals on the communications bus to the processor that sets the running times of the motor. The communications bus may convey these signals with two polarity-insensitive wires.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An actuator system for a heating, ventilating and air conditioning (HVAC) system, comprising:
a motor;
a gear train mechanically connected to the motor and having an HVAC actuator shaft;
a processor connected to the motor;
a shaft position indicator connected to the gear train and to the processor;
a communications bus connected to the processor; and
a controller connected to the communications bus; and
wherein:
the actuator shaft is rotatable a first number of degrees from a first position to a second position in a first direction and a second number degrees from a third position to a fourth position in a second direction;
a time for the actuator shaft to rotate the first number of degrees from the first position to the second position in the first direction is a first running time;
a time for the actuator shaft to rotate the second number of degrees from the third position to the fourth position in the second direction is a second running time;
the processor is programmed to set the first running time to a first time value and the second running time to a second time value for each of a plurality of different modes including a first normal mode and a test mode, where the first and second time values are different from one another in at least one of the plurality of different modes, wherein the first and second running times are separately adjustable and programmable via an entry from a user interface of the controller, wherein the first and second time values in the test mode are each different from the first and second time values in the first normal mode;
the first and second running times are separately adjustable and programmable with entries by a user put into the controller;
signals representative the entries are sent from the controller to the processor via the communications bus;
one or more of the first and second running times are adjusted by the user in realtime at the controller; and
wherein one of the plurality of modes is selectable by the user at the controller, causing the first and second running times associated with the selected mode to be set.

2. The actuator system of claim 1, wherein:
the first position is a closed position;
the second position is an open position;
the third position is the open position; and
the fourth position is the closed position.

3. The actuator system of claim 1, wherein the first and second running times are each programmable to be different from one another during different modes.

4. The actuator system of claim 1, wherein the communications bus conveys the signals with two polarity-insensitive wires.

5. The actuator system of claim 1, wherein the controller includes a user interface.

6. The actuator system of claim 1, further comprising a selector accessible on the actuator, the selector configured to select one of the plurality of different modes.

7. The actuator system of claim 6, wherein the selector is accessible from two opposing sides of the actuator.

8. The actuator system of claim 1, wherein the plurality of different modes includes at least two normal modes, the test mode, and an emergency mode, wherein at least one of the first and second running times is different in each of the plurality of different modes.

9. A method for adjusting running times in an actuator associated with a heating, ventilating and air conditioning (HVAC) system, comprising:
providing an HVAC actuator comprising a motor, a gear train connected to the motor, and an actuator shaft connected to the gear train; and
entering signals into a processor to program a speed of the motor and thus program a first programmed running time of the actuator shaft in a first direction from a first position to a second position and a second programmed running time of the actuator shaft in a second direction opposite the first direction from a third position to a fourth position for each of a plurality of different modes including a first normal mode and a test mode, wherein the first programmed running time differs from the second programmed running time in at least one of the plurality of different modes;

making entries by a user into a controller to provide signals, representative of adjustments to one or more of the first and second running times for each of the plurality of different modes, via a communications bus to the processor for adjustments of the speed of the motor and thus adjustments of one or more of the first and second running times of the actuator shaft for each of the plurality of different modes;

making a selection by the user at the controller of one of the plurality of different modes, thereby obtaining adjustments of the one or more of the first and second running times of the actuator shaft in real-time associated with the selected mode;

wherein the actuator shaft can be connected to an apparatus in a heating, ventilating and air conditioning system; and wherein the first programmed running time and the second programmed running time in the test mode are each different values from first and second programmed running times in the first normal mode.

10. The method of claim 9, further comprising:
selecting the test mode at the controller; and
wherein selecting the test mode will result in programming the one or more of the first and second running times of the actuator shaft to be shorter times than the first and second running times of any other of the plurality of different modes.

11. The method of claim 9, wherein the communications bus conveys the signals with two polarity-insensitive wires.

12. The method of claim 9, wherein making entries and the selection by the user are made on a user interface in the controller.

13. The method of claim 9, further comprising the user selecting one of the plurality of different modes by using a selector accessible on the actuator, the selector configured to select one of the plurality of different modes.

14. The method of claim 9, wherein the plurality of different modes includes at least two normal modes, the test mode, and an emergency mode, wherein at least one of the first and second running times is different in each of the plurality of different modes.

15. An actuator system for a heating, ventilating and air conditioning (HVAC) system, comprising:
a motor;
a gear train mechanically connected to the motor;
an HVAC actuator shaft mechanically coupled to the gear train; and
a processor connected to the motor;
a communications bus connected to the processor;
a controller connected to the communications bus; and wherein:
the processor programs running times of the motor according to one of a plurality of modes of operation including at least a first normal mode, a test mode, and a saver mode, each of the plurality of modes of operation having a different programmed running time of the motor;
a first programmed running time of the motor is an amount time that the actuator shaft moves from a first position to a second position as driven by the motor via the gear train;
a second programmed running time of the motor is an amount of time that the actuator shaft moves from a second position to a first position as driven by the motor via the gear train;
a test running time corresponding to the test mode for moving the actuator shaft from the first position to the second position is less than a saver running time corresponding to a saver mode for moving the actuator shaft from the first position to the second position and a saver running time is greater than the first normal running time corresponding to the first normal application mode for moving the actuator from the first position to the second position;
the first and second programmed running times for each of the plurality of modes are separately adjustable and programmable to be different from one another, with entries by a user put into the controller;
the first and second programmed running times in the test mode are each different from the first and second programmed running times in the first normal mode and in the saver mode;
signals representative the entries are sent from the controller to the processor via the communications bus; and
one or more of the first and second programmed running times are adjusted by the user in real-time at the controller.

16. The system of claim 15, wherein:
the first position is a closed position; and
the second position is an open position.

17. The system of claim 15, wherein the communications bus conveys the signals with two polarity-insensitive wire.

18. The actuator system of claim 15, wherein the controller includes a user interface.

19. The actuator system of claim 15, further comprising a selector accessible on the actuator, the selector configured to select one of the plurality of modes.

20. The actuator system of claim 15, wherein the plurality of modes includes at least two normal modes, the test mode, and the saver mode, wherein at least one of the first and second running times is different in each of the plurality of modes.

* * * * *